US012799029B2

(12) United States Patent
Purola et al.

(10) Patent No.: US 12,799,029 B2
(45) Date of Patent: Nov. 17, 2026

(54) METHOD AND APPARATUS FOR THERMAL ENERGY STORAGE USING ROTARY GENERATED THERMAL ENERGY

(71) Applicant: Coolbrook Oy, Helsinki (FI)

(72) Inventors: Veli Matti Purola, Helsinki (FI); Tuomas Ouni, Helsinki (FI)

(73) Assignee: COOLBROOK OY, Helsinki (FI)

( * ) Notice: Subject to any disclaimer, the term of this patent is extended or adjusted under 35 U.S.C. 154(b) by 727 days.

(21) Appl. No.: 18/046,323

(22) Filed: Oct. 13, 2022

(65) Prior Publication Data

US 2023/0115221 A1 Apr. 13, 2023

Related U.S. Application Data

(60) Provisional application No. 63/255,433, filed on Oct. 13, 2021.

(51) Int. Cl.
*C04B 7/43* (2006.01)
*B28B 11/24* (2006.01)
(Continued)

(52) U.S. Cl.
CPC ............ *C04B 7/432* (2013.01); *B28B 11/243* (2013.01); *C01B 3/24* (2013.01); *C01B 32/16* (2017.08);
(Continued)

(58) Field of Classification Search
CPC .......... F22B 3/06; F24H 1/0018; F27B 7/362; F27B 9/10; F27B 2007/367;
(Continued)

(56) References Cited

U.S. PATENT DOCUMENTS 4,614,229 A 9/1986 Oldweiler
11,085,705 B2 * 8/2021 Johnson .............. F28D 20/0056
(Continued)

FOREIGN PATENT DOCUMENTS

DE 102008043705 A1 5/2010
EP 1063273 A1 12/2000
(Continued)

OTHER PUBLICATIONS

International Search Report and Written Opinion, PCT/FI2021/050688, dated Jan. 18, 2023 (16 pp.).
(Continued)

*Primary Examiner* — Gregory A Wilson
(74) *Attorney, Agent, or Firm* — Eversheds Sutherland (US) LLP

(57) ABSTRACT

Methods for inputting thermal energy into fluidic medium in a thermal energy production and storage process include generation of a heated fluidic medium by at least one rotary apparatus having a rotor with at least one row of rotor blades and a stator configured as an assembly of stationary vanes arranged upstream of the at least one row of rotor blades. An amount of thermal energy is imparted to a stream of fluidic medium by a series of energy transformations occurring when the stream of fluidic medium passes through the stationary vanes and the rotor blades. The method further includes integration of the at least one rotary apparatus into a thermal energy production and storage facility configured to carry out thermal energy production and storage and conducting an amount of input energy into the at least one rotary apparatus integrated into the thermal energy production and storage facility.

36 Claims, 6 Drawing Sheets

(51) Int. Cl.

| | |
|---|---|
| ***C01B 3/24*** | (2006.01) |
| ***C01B 32/16*** | (2017.01) |
| ***C03B 5/235*** | (2006.01) |
| ***C03B 37/022*** | (2006.01) |
| ***C03C 1/00*** | (2006.01) |
| ***C04B 7/36*** | (2006.01) |
| ***C04B 7/42*** | (2006.01) |
| ***C04B 7/47*** | (2006.01) |
| ***C04B 33/24*** | (2006.01) |
| ***C04B 33/32*** | (2006.01) |
| ***C10G 9/40*** | (2006.01) |
| ***C10G 11/20*** | (2006.01) |
| ***C10G 47/32*** | (2006.01) |
| ***C10G 47/36*** | (2006.01) |
| ***C21B 13/08*** | (2006.01) |
| ***D01F 9/22*** | (2006.01) |
| ***F22B 3/06*** | (2006.01) |
| ***F23G 7/06*** | (2006.01) |
| ***F24H 1/00*** | (2022.01) |
| ***F24V 30/00*** | (2018.01) |
| ***F24V 40/00*** | (2018.01) |
| ***F27B 7/20*** | (2006.01) |
| ***F27B 7/34*** | (2006.01) |
| ***F27B 9/10*** | (2006.01) |
| ***F28D 20/00*** | (2006.01) |

(52) U.S. Cl.

CPC ............ *C03B 5/235* (2013.01); *C03B 37/022* (2013.01); *C03C 1/004* (2013.01); *C04B 7/367* (2013.01); *C04B 7/42* (2013.01); *C04B 7/475* (2013.01); *C04B 33/24* (2013.01); *C04B 33/32* (2013.01); *C10G 9/40* (2013.01); *C10G 11/20* (2013.01); *C10G 47/32* (2013.01); *C10G 47/36* (2013.01); *C21B 13/085* (2013.01); *D01F 9/22* (2013.01); *F22B 3/06* (2013.01); *F23G 7/061* (2013.01); *F24H 1/0018* (2013.01); *F24V 30/00* (2018.05); *F24V 40/00* (2018.05); *F27B 7/2016* (2013.01); *F27B 7/34* (2013.01); *F27B 9/10* (2013.01); *F28D 20/0056* (2013.01); *C01B 2203/0205* (2013.01); *C01B 2203/0833* (2013.01); *C01B 2203/1241* (2013.01); *C04B 2290/20* (2013.01); *C10G 2300/1033* (2013.01); *C10G 2300/4081* (2013.01); *C10G 2300/807* (2013.01); *F23G 2204/00* (2013.01); *F23G 2209/14* (2013.01); *F28D 2020/0013* (2013.01); *F28D 2020/0026* (2013.01); *F28D 2020/0047* (2013.01); *F28D 2020/006* (2013.01); *F28D 2020/0078* (2013.01)

(58) Field of Classification Search

CPC ......... F28D 20/0056; F28D 2020/0026; F28D 2020/0047; F28D 20/20

See application file for complete search history.

(56) References Cited

U.S. PATENT DOCUMENTS

| | | | | |
|---|---|---|---|---|
| 2006/0116543 | A1 | 6/2006 | Bellet et al. | |
| 2007/0007175 | A1 | 1/2007 | Strack et al. | |
| 2008/0128326 | A1 | 6/2008 | McCoy et al. | |
| 2008/0202985 | A1 * | 8/2008 | Hatfield | C01B 3/56 208/403 |
| 2012/0024749 | A1 | 2/2012 | Strack et al. | |
| 2012/0048717 | A1 * | 3/2012 | Frick | F22B 3/06 203/22 |
| 2012/0319410 | A1 * | 12/2012 | Ambrosek | F02C 6/10 290/1 R |
| 2014/0243569 | A1 | 8/2014 | Seppala et al. | |
| 2019/0284485 | A1 | 9/2019 | Willigenburg | |
| 2020/0018557 | A1 * | 1/2020 | Johnson | F28D 20/02 |
| 2020/0114332 | A1 | 4/2020 | Xu et al. | |
| 2020/0290939 | A1 | 9/2020 | Willigenburg | |
| 2021/0171836 | A1 | 6/2021 | Purola | |

FOREIGN PATENT DOCUMENTS

| | | | | |
|---|---|---|---|---|
| EP | 3249027 | A1 | 11/2017 | |
| EP | 3415587 | A1 | 12/2018 | |
| EP | 3725865 | A1 | 10/2020 | |
| JP | 858-213087 | A | 12/1983 | |
| JP | 2003504485 | A | 2/2003 | |
| JP | 6177878 | B2 * | 8/2017 | F22B 1/22 |
| WO | 2017125833 | A1 | 7/2017 | |
| WO | WO-2021122665 | A1 * | 6/2021 | F24H 9/06 |

OTHER PUBLICATIONS

1 Extended European Search Report, EP 22880472.0, dated Jul. 30, 2025 (9 pp.).

* cited by examiner

METHOD AND APPARATUS FOR THERMAL ENERGY STORAGE USING ROTARY GENERATED THERMAL ENERGY

CROSS-REFERENCE TO RELATED APPLICATION

This application claims priority to U.S. Provisional Patent Application No. 63/255,433, filed Oct. 13, 2021, which is incorporated herein by reference.

FIELD OF THE INVENTION

The present invention generally relates to systems and methods for inputting thermal energy (heat) into fluids. In particular, the invention relates to tools and processes for optimizing energy efficiency and reducing greenhouse gas and particle emissions in thermal energy production and storage carried out at high and extremely high temperatures.

BACKGROUND

Industry and governments have been combating to find technologies to achieve significant reductions in greenhouse gas (GHG) emission reduction. Heavy industrial processes, including generation and storage of thermal energy, have a key role to reach low emission targets set by companies, governments and international organizations.

Thermal energy storage (TES) is a key technology that addresses challenges associated with intermittency in renewable energy generation and waste heat availability and alleviates the mismatch between energy supply and demand. Thermal energy storage has several ways of physical realization. There are also various ways to classify thermal energy storage materials and systems. While sensible and latent heat storage systems utilize the principles of physics, thermochemical storage systems additionally utilize chemical reactions. Energy storage material species exist different physical phases, namely as solids, liquids, gases or as phase change materials (PCMs). Most common types of TES materials are recognized as follows.

Sensible heat storage (SHS) materials undergo no change in phase over the temperature range encountered in the storage process. Hence, in SHS species an amount of stored energy is approximately proportional to temperature fluctuations in the storage material. SHS species are typically solids (e.g. metals, stone, and ceramics), liquids (e.g. molten salts), or combinations thereof (e.g. molten salt/stone, molten metal/ceramics). SHS materials have relatively low price and are simple in operation; therefore, application of these materials is rather widespread.

Latent heat storage (LHS) materials involve the storage of energy in phase change materials, which typically change their physical phase from solid to liquid and vice versa. Phase change is always accompanied with the absorption or release of heat and occurs at a constant temperature. Stored energy is equivalent to the heat (enthalpy) of melting and freezing. PCMs may include solid-solid, solid-liquid, solid-gas, and liquid-gas material species, with solid-liquid materials being the most common ones. Typical solid-solid materials include salts and typical solid—liquid materials include metals and salts.

Thermochemical storage (TCS) materials store and release heat by reversible thermochemical reactions. The energy is stored in the form of chemical compounds generated by endothermic reactions, and the energy can be recovered any time by recombining these compounds in exothermic reactions. Stored and released energy is equivalent to the heat (enthalpy) of the reaction. Typical TCS material species are dissociating solids or liquids, or gaseous components for catalytic reactions. TES systems may also vary in terms of a heat transfer fluid (HTF) utilized therein.

Dependent on the heat storage material species, temperature ranges for TES systems vary from 0° C. to about 1000° C. While low-temperature storage materials (with working temperature range is 0° C. to about 120° C.) are used in heating, ventilation and air conditions (HVAC) systems, intermediate (working t range between about 120-500° C.) and high-temperature (working t range exceeding 500° C.) storage materials are typically used in applications related to power generation (e.g. solar power generation) and other high-temperature industries. An industrial (high-temperature) heat storage unit comprising the heat storage medium is typically connected to a heat engine, e.g. a steam turbine to generate electricity. Additionally or alternatively, heat recovered from thermal energy storage can be used for heating or other heat consuming purpose. Typically, the higher is the storage temperature, the higher is efficiency of the system. Therefore, a need still exists in producing high temperature fluids for heating storage materials to the temperatures of above 500° C. in an efficient and environmentally friendly manner.

A common application of thermal energy storage in the industry is so-called regenerative heating or regenerative heat exchanger. A regenerative heat exchanger, or more commonly a regenerator, is a type of heat exchanger where heat from the hot fluid is intermittently stored in a thermal storage medium before it is transferred to the cold fluid. To accomplish this, the hot fluid is first brought into contact with the heat storage medium, then the fluid is displaced with the cold fluid, which absorbs the heat. Usually, the application will use this process cyclically or repetitively, and often a number of thermal storages is needed that are in different stages of the heat absorption-desorption cycle. Regenerative heating was one of the most important technologies developed during the Industrial Revolution when it was used in the hot blast process in blast furnaces. Later on, it was used in glass melting furnaces and in steel making to increase the efficiency of open-hearth furnaces, as well as in high pressure boilers and in chemical manufacturing and other applications, where it continues to be important also nowadays.

Traditionally, thermal energy has been mainly produced through burning of fossil fuels leading to significant $CO_2$ emissions. Replacing fossil fuels with wood or other bio-based materials has significant resource limitations and other significant environmental implications such as sustainable land use. Electrification of processes involved in production of thermal energy has been seen as a solution to reduce emission.

One of the obstacles for electrification was achieving high temperatures, e.g. up to 1000° C., needed in thermal energy production and storage. In particular, while electricity has already been used for some high temperature processes, in most cases, neither the technologies nor the economics are yet in place to do so.

Also concentrated solar power has been used for direct heating of heat transfer media and for generating thermal energy for heat storage. However, in such a case, thermal energy storage is bound to a distance to solar power collectors. Thermal stability and vaporisation temperature pose limits for maximum allowable temperature of heat transfer media that typically in concentrated solar power collectors is a liquid. Generating electricity by solar panels is more flexible and is not bound to a solar panel field, since the solar panels can be installed wherever space allows, like on roofs of houses in in the city centre to bring heat storage solutions closer to (heat) consumers. Utilization of solar power in heat storage applications depends on a heat storage concept and optionally on the heat transfer fluid utilized. Typical heat transfer fluids include synthetic oils with maximum operating temperature ($t_{o\ max}$) of about 400° C., molten salts ($t_{o\ max}$ about 565° C.) and air ($t_{o\ max}$ about 700° C.). Problems associated with mentioned fluids include heat losses, pumping costs and leakages, particularly, when the distances between the solar panel fields are long. Using air as the heat transfer fluid requires expanding the size of transfer pipelines, which significantly raises the costs of heat transfer infrastructure.

A number of rotary solutions have been proposed for heating purposes. Thus, U.S. Pat. No. 11,098,725 B2 (Sanger et al) discloses a hydrodynamic heater pump device operable to selectively generate a stream of heated fluid and/or pressurized fluid. A mentioned hydrodynamic heater pump is designed to be incorporated in an automotive vehicle cooling system to provide heat for warming a passenger compartment of the vehicle and to provide other capabilities, such as window deicing and engine cooling. The disclosed device may also provide a stream of pressurized fluid for cooling an engine. Disclosed technology is based on friction; and, since the fluid to be heated is liquid, the presented design is not suitable for conditions involving extreme turbulence of gas aerodynamics.

U.S. Pat. No. 7,614,367 B1 (Frick) discloses a system and method for flamelessly heating, concentrating or evaporating a fluid by converting rotary kinetic energy into heat. Configured for fluid heating, the system may comprise a rotary kinetic energy generator, a rotary heating device, and a primary heat exchanger, all in closed-loop fluid communication. The rotary heating device may be a water brake dynamometer. The document discloses the use of the system for heating water in offshore drilling or production platforms. However, the presented system is not suitable for heating gaseous media, neither is it feasible for use with high and extremely high temperatures (due to liquid stability, vapor pressure, etc.).

Additionally, some rotary turbomachine-type devices are known to implement the processes of hydrocarbon (steam) cracking and aim at maximizing the yields of the target products, such as ethylene and propylene.

In this regard, an update in the field of technology related to design and manufacturing of efficient heating systems, in particular those suitable for high and extremely high temperature related applications, is still desired, in view of addressing challenges associated with raising temperatures of fluidic substances in efficient and environmentally friendly manner.

SUMMARY OF THE INVENTION

An objective of the present invention is to solve or to at least mitigate at least some of the problems arising from the limitations and disadvantages of the related art. One or more objectives are achieved by various embodiments of the methods for generation of a heated fluidic medium described herein, and the rotary apparatuses as defined herein.

In an aspect, a method for thermal energy generation and thermal energy storage comprises generation of a heated fluidic medium by at least one rotary apparatus integrated into a thermal energy production and storage facility.

According to an embodiment, a method for thermal energy production and storage comprises generation of a heated fluidic medium by at least one rotary apparatus integrated into a thermal energy production and storage facility improves energy efficiency or reduces greenhouse gas and particle emissions, or both.

In embodiments, the method for producing and storing thermal energy comprises generation of heated fluidic medium by at least one rotary apparatus integrated into a thermal energy production and storage facility, the at least one rotary apparatus comprising: a casing with at least one inlet and at least one exit, a rotor comprising at least one row of rotor blades arranged over a circumference of a rotor hub mounted onto a rotor shaft, and a plurality of stationary vanes arranged into an assembly at least upstream of the at least one row of rotor blades, the method further comprising: conducting an amount of input energy into the at least one rotary apparatus integrated into the thermal energy production and storage facility, the input energy comprising electrical energy, operating said at least one rotary apparatus integrated into said thermal energy production and storage facility to carry out thermal energy production such that an amount of thermal energy is imparted to a stream of fluidic medium directed along a flow path formed inside the casing between the inlet and the exit by virtue of a series of energy transformations occurring when said stream of fluidic medium passes through the stationary vanes and the at least one row of rotor blades, respectively, whereby a stream of fluidic medium heated to a temperature essentially equal to or exceeding about 500 degrees Celsius (° C.) is generated, and supplying the stream of heated fluidic medium generated by the at least one rotary apparatus into at least one thermal energy storage unit provided within the thermal energy production and storage facility.

In another aspect, a method is provided for inputting thermal energy into fluidic medium during thermal energy production and storage.

In embodiments, the method comprises operating the at least one rotary apparatus operatively connected to at least one thermal energy storage unit configured to store thermal energy in the thermal energy production and storage facility. In embodiments, the at least one thermal energy storage unit comprises a thermal energy storage medium configured to store thermal energy in the thermal energy production and storage facility, wherein the amount of thermal energy is transferred from the heated fluidic medium generated by the at least one rotary apparatus to said thermal energy storage medium.

In embodiments, in said method, the thermal energy storage medium provided within the at least one thermal energy storage unit is any one of sensible heat storage (SHS) medium, latent heat storage (LHS) medium or thermochemical storage (TCS) medium. In embodiments, in said method, the thermal energy storage medium is a stable phase material or a phase change material (PCM). In embodiments, in said method, the thermal energy storage medium is provided in any one of: a solid phase, a liquid phase, a gaseous phase, or any combination thereof. In embodiments, in said method, the thermal energy storage medium comprises dissociating solids, liquids, or gaseous compounds.

In embodiments, in said method, the thermal energy storage medium is mobile, and it comprises a fluid. In embodiments, the thermal energy storage medium comprises molten salt or a fluidized sand bed.

In embodiments, in said method, the thermal energy storage medium is immobile, and it comprises any one of: metals, stone, concrete, sand, ceramics, or a combination thereof. In embodiments, the thermal energy storage medium comprises a fixed sand bed or a rock bed.

In embodiments, the method comprises generation of the heated fluidic medium in the rotary apparatus. In embodiments, in said method, the fluidic medium that enters the rotary apparatus is an essentially gaseous medium. In embodiments, in said method, the heated fluidic medium generated in the rotary apparatus comprises any one of: air, nitrogen ($N_2$), steam ($H_2O$), or a combination thereof. In embodiments, in said method, the heated fluidic medium generated in the rotary apparatus is a recycle gas recycled from off-gases generated during thermal energy production and storage in the thermal energy production and storage facility.

In embodiments, in said method, an amount of thermal energy is transferred from the heated fluidic medium generated by the at least one rotary apparatus or in the at least one rotary apparatus to a heat transfer fluid provided in the at least one thermal energy storage unit. In embodiments, in said method, the heat transfer fluid is synthetic oil or molten salt.

In embodiment, the method further comprises generation of the heated fluidic medium outside the rotary apparatus through a process of heat transfer between the heated fluidic medium generated in the rotary apparatus and a stream of fluidic medium bypassing the rotary apparatus.

In embodiments, in said method, an amount of thermal energy is transferred from the heated fluidic medium generated by the at least one rotary apparatus or in the at least one rotary apparatus to the at least one thermal energy storage unit via a heat exchanger. In embodiments, in said method, the amount of thermal energy is transferred from the heated fluidic medium generated by the at least one rotary apparatus or in the at least one rotary apparatus to the thermal energy storage medium and/or to the heat transfer fluid provided in the at least one thermal energy storage unit. In embodiments, in said method, the amount of thermal energy is transferred from the heated fluidic medium generated by the at least one rotary apparatus or in the at least one rotary apparatus to the thermal energy storage medium via a heat transfer tube network immersed in the thermal energy storage medium, wherein the thermal energy storage medium is immobile.

In embodiments, the method comprises generation of the fluidic medium heated to the temperature essentially equal to or exceeding about 500 degrees Celsius (° C.), or to the temperature essentially equal to or exceeding about 1200° C., or to the temperature essentially equal to or exceeding about 1700° C.

In embodiments, the method comprises adjusting velocity and/or pressure of the stream of fluidic medium propagating through the rotary apparatus, to produce conditions, at which the stream of the heated fluidic medium is generated.

In embodiments, in said method, the heated fluidic medium is generated by at least one rotary apparatus comprising two or more rows of rotor blades sequentially arranged along the rotor shaft.

In an embodiment, in said method, the heated fluidic medium is generated by at least one rotary apparatus further comprising a diffuser area arranged downstream of the at least one row of rotor blades, the method furthers comprises operating the at least one rotary apparatus integrated into the thermal energy production and storage facility such, that an amount of thermal energy is imparted to a stream of fluidic medium directed along a flow path formed inside the casing between the inlet and the exit by virtue of a series of energy transformations occurring when said stream of fluidic medium successively passes through the stationary guide vanes, the at least one row of rotor blades and the diffuser area, respectively, whereby a stream of heated fluidic medium is generated. The diffuser area may be configured with or without stationary vanes.

In embodiment, the at least one rotary apparatus is configured to implement a fluidic flow, between the inlet and the exit, along a flow path established in accordance with any one of: an essentially helical trajectory formed within an essentially toroidal-shaped casing; an essentially helical trajectory formed within an essentially tubular casing, an essentially radial trajectory, and along the flow path established by virtue of the stream of fluidic medium in the form of two spirals rolled up into vortex rings of right and left directions.

In embodiments, in said method, the amount of thermal energy added to the stream of fluidic medium propagating through the rotary apparatus is controlled by adjusting the amount of input energy conducted into the at least one rotary apparatus integrated into the thermal energy production and storage facility.

In embodiments, the method further comprises introducing a reactive compound or a mixture of reactive compounds to the stream of fluidic medium propagating through the rotary apparatus and/or through a heating apparatus, whereupon the amount of thermal energy is added to said stream of fluidic medium through exothermic reaction(s). In embodiment, the reactive compound or a mixture of reactive compounds is introduced to the stream of fluidic medium preheated to a predetermined temperature. In embodiment, the reactive compound or a mixture of reactive compounds is introduced to the stream of fluidic medium preheated to a temperature essentially equal to or exceeding about 1700° C.

In embodiments, the method comprises generation of the heated fluidic medium by at least two rotary apparatuses integrated into the thermal energy production and storage facility, wherein the at least two rotary apparatuses are connected in parallel or in series. In embodiments, the method comprises generation of the heated fluidic medium by at least two sequentially connected rotary apparatuses, wherein the stream of fluidic medium is preheated to a predetermined temperature in at least a first rotary apparatus in a sequence, and wherein said stream of fluidic medium is further heated in at least a second rotary apparatus in the sequence by inputting an additional amount of thermal energy into the stream of preheated fluidic medium propagating through said second rotary apparatus. In embodiments, in said method, in at least the first rotary apparatus in the sequence, the stream of fluidic medium is preheated to a temperature essentially equal to or exceeding about 1700° C. In embodiments, in said method, the additional amount of thermal energy is added to the stream of fluidic medium propagating through said at least second rotary apparatus in the sequence by virtue of introducing the reactive compound or a mixture of compounds into said stream. In embodiments, the method comprises introducing the reactive compound or a mixture of compounds into the production and storage of thermal energy.

In embodiments, in said method, the fluidic medium to be heated is selected from the group consisting of a feed gas, a recycle gas, a make-up gas, and a process fluid recycled or generated by a thermal energy producing process.

In embodiment, the method further comprises increasing pressure in the stream of fluidic medium propagating through the rotary apparatus.

In embodiment, in said method, the amount of electrical energy conducted as the input energy into the at least one rotary apparatus integrated in the thermal energy production and storage facility is within a range of about 5 percent to 100 percent.

In embodiment, in said method, the amount of electrical energy conducted as the input energy into the at least one rotary apparatus integrated in the thermal energy production and storage facility is obtainable from a source of renewable energy or a combination of different sources of energy, optionally, renewable energy.

In embodiment, in said method, the at least one rotary apparatus is utilized to balance variations, such as oversupply and shortage, in the amount of electrical energy (obtained through supply and/or production, for example), optionally renewable electrical energy, by virtue of being integrated, into the thermal energy and production facility, together with an at least one non-electrical energy operable heater device.

In another aspect, a thermal energy production and storage facility is provided. In embodiments, said facility comprises at least one rotary apparatus configured to generate a heated fluidic medium, and at least one thermal energy storage unit, the at least one rotary apparatus integrated into the thermal energy production and storage facility and comprising: a casing with at least one inlet and at least one exit, a rotor comprising at least one row of rotor blades arranged over a circumference of a rotor hub mounted onto a rotor shaft, and a plurality of stationary vanes arranged into an assembly at least upstream of the at least one row of rotor blades, wherein said at least one rotary apparatus is configured to: receive an amount of input energy, the input energy comprising electrical energy, to operate such that an amount of thermal energy is imparted to a stream of fluidic medium directed along a flow path formed inside the casing between the inlet and the exit by virtue of a series of energy transformations occurring when said stream of fluidic medium passes through the stationary vanes and the at least one row of rotor blades, respectively, whereby a stream of fluidic medium heated to a temperature essentially equal to or exceeding about 500 degrees Celsius (° C.) is generated, and to supply the stream of heated fluidic medium into the at least one thermal energy storage unit provided within the thermal energy production and storage facility.

In embodiments, the at least one thermal energy storage unit comprises a thermal energy storage medium configured to store thermal energy in the thermal energy production and storage facility, and wherein that at least one rotary apparatus is connected to said at least one thermal energy storage unit such that the amount of thermal energy is transferred from the heated fluidic medium generated in the at least one rotary apparatus to said thermal energy storage medium.

In embodiments, in said thermal energy production and storage facility, the at least one rotary apparatus comprises two or more rows of rotor blades sequentially arranged along the rotor shaft. In an embodiment, stationary vanes arranged into the assembly upstream of the at least one row of rotor blades are configured as stationary guide vanes. In an embodiment, the at least one rotary apparatus further comprises a diffuser area arranged downstream of the at least one row of rotor blades. The diffuser area may be configured with or without stationary diffuser vanes. In some configurations, vaned diffuser may be implemented as a plurality of stationary vanes arranged into an assembly downstream of the at least one row of rotor blades.

In embodiments, the thermal energy production and storage facility is configured to implement a process or processes related to thermal energy production and storage through a method according to some previously defined aspects and embodiments In a further aspect, an assembly is provided and comprises at least two rotary apparatuses according to some previous aspect, said rotary apparatuses being connected in parallel or in series.

In a further aspect, an arrangement is provided and comprises at least one rotary apparatus according to some previous aspect, said at least one rotary apparatus being connected to at least one thermal energy storage medium.

The utility of the present invention arises from a variety of reasons depending on each particular embodiment thereof.

Overall, the embodiments offer an electrified rotary fluid heater to provide high temperature fluids, such as gases, to be used in thermal energy production and storage instead of fuel-fired heaters, for example. The presented method enables generating thermal energy and inputting the thermal energy into a thermal energy storage medium at high—and extremely high temperatures, such as temperatures generally exceeding 500° C. The invention offers apparatuses and methods for heating the fluidic substances to the temperatures within a range of about 500° C. to about 2000° C., i.e. the temperatures used in thermal energy production and storage. The rotary apparatus disclosed hereby allows for heating fluids to a predetermined temperatures (up to 1700° C., for example), which can be further elevated (to up to 2000° C. and beyond) through a concept of so-called booster heating.

Thermal energy production and storage typically employs utilities with high demand for thermal energy and hence, for heat consumption, such as fired heaters, for example. Said heat-consuming utilities are used to heat fluids to the temperatures needed for the production of thermal energy. The invention presented herewith enables replacing conventional heat-consuming utilities, such as fuel fired heaters, by a rotary apparatus. In the method, the advantages accompanied by replacing fired heaters with the rotary apparatus include at least:

- Support for electrified heating;
- Elimination or at least significant reduction of greenhouse gas (such as NO, $CO_2$, CO, $NO_X$), other harmful components (such as for example HCl, $H_2S$, $SO_2$, and heavy metals) originating from fuels, particle emissions and soot emissions;
- Reduced volume of a heater: the volume of the rotary apparatus is at least one order of magnitude smaller as compared to the volume of conventional process heaters or heat exchangers;
- Decreased investment costs;
- Improved safety in case of using flammable, hazardous fluids/gases;
- Feasibility in handling large volumes of gases;
- Absence of pressure drop;
- Possibility of using the rotary (heater) apparatus also for compression of gases (a blower function), hence eliminating the need for additional blower, fan or compressor to overcome the pressure drop over a heat storage unit, pipelines and/or possible recycling of hot process gases;
- Independency on temperature difference in direct heating of gases. Temperature rise in the rotary apparatus can be in range of about 10 to 1700° C. or more;
- Possibility for using the rotary apparatus in indirect heating of fluids optionally by optimizing temperature difference in heat exchanger(s);

Possibility for at least partial recycling of hot process gases, thus improving and making simpler the heat recovery and improving energy efficiency;

Possibility for further raising the temperature of gases to be heated by adding reactive chemicals which further increase the gas temperature up to e.g. 2000° C. or higher by exothermic reactions.

In embodiments, the rotary apparatus can be used to replace conventional fired heaters or process furnaces for direct or indirect heating or thermal energy generation in thermal energy production and storage. With increased cost-efficiency of renewable electricity, namely the rapid development of wind and solar power, it is possible to replace fossil fuel firing with the rotary apparatus described herein powered with renewable electricity leading to significant greenhouse gas emission reductions. The rotary apparatus allows electrified heating of fluids to temperatures up to 1700° C. and higher. Such temperatures are difficult or impossible to reach with current electrical heating applications.

The rotary apparatus can be used for direct heating of process gases, inert gases, air or any other gases or for indirect heating of process fluids (liquid, vapor, gas, vapor/liquid mixtures etc.). Heated fluid generated in said rotary apparatus can be used for heating any one of gases, vapor, liquid, and solid materials. The rotary apparatus can at least partly replace—or it can be combined with (e.g. as pre-heater) multiple types of furnaces, heaters, kilns, gasifiers, and reactors that are traditionally fired or heated with solid, liquid or gaseous fossil fuels or in some cases bio-based fuels. Such appliances include but are not limited to: furnaces, ovens, kilns, heaters, burners, incinerators, boilers, dryers, conveyor devices, reactors, and their combinations. Some particular examples include, but are not limited to: blast furnaces, cupola furnaces, pot and tank furnaces, shaft furnaces, regenerative furnaces, rotary kilns, steam boilers, catalytic reactors and fluidized bed reactors. Any apparatus capable of producing thermal energy intended for storage may be at least partially replaced by the rotary apparatus. Heated gases can be flammable, reactive, or inert and can be recycled back to the rotary apparatus. In addition to heating, the rotary apparatus may act as combined blower and heater allowing to increase pressure and to recycle gases.

Heated fluids, such as gases, can be used in a variety of applications. A heated object can be a solid material, liquid or gas, which gas further takes part in a number of (reversible) reactions, or phase transitions, or is used as a heating media. Use of inert hot gases as heating media is a preferred means when process fluids are at high pressure or in vacuum. Thus, improving thermal energy production and storage may contribute to increased efficiency in a variety of applications that rely on thermal energy.

The invention enables the reduction greenhouse gas (CO, $CO_2$, $NO_x$) emission and particle emissions when replacing fired heaters. By using the rotary apparatus, it is possible to have closed or semi-closed heating loops for processes, and to improve energy efficiency of the processes by reducing heat losses through flue gas. In conventional heaters, flue gases can be recycled only partly.

Additionally, the present solution enables improved optimization of the temperature difference(s) in the heat exchangers in indirect heating.

The invention further provides for flexibly using electrical energy, such as electrical energy obtainable from renewable sources. Production of renewable energy varies on daily basis and even on hourly basis. The invention allows for balancing renewable electricity production by integration of the rotary apparatus disclosed herewith with conventional fuel-operated (fuel-fired) heaters to provide heat to the thermal energy production and storage, for example.

The invention further enables a reduction in the on-site investment costs as compared to traditional fossil fired furnaces and solar collectors. Moreover, the invention enables setting a facility for renewable electricity generation at a significantly longer distance to/from thermal energy storage units, as compared to existing solutions. This provides additional flexibility in distancing said thermal energy storage units with regard to a heat consumer, e.g. bringing the heat storage closer to the heat consumer.

The expression "a number of" refers hereby to any positive integer starting from one (1), e.g. to one, two, or three. The expression "a plurality of" refers hereby to any positive integer starting from two (2), e.g. to two, three, or four. The terms "first" and "second", are used hereby to merely distinguish an element from another element without indicating any particular order or importance, unless explicitly stated otherwise.

The term "gasified" is utilized hereby to indicate matter being converted into a gaseous form by any possible means.

The terms "heat" and "thermal energy" are used interchangeably herein.

Different embodiments of the present invention will become apparent by consideration of the detailed description and accompanying drawings.

DETAILED DESCRIPTION OF THE EMBODIMENTS

Detailed embodiments of the present invention are disclosed herein with the reference to accompanying drawings.

Figure 1:
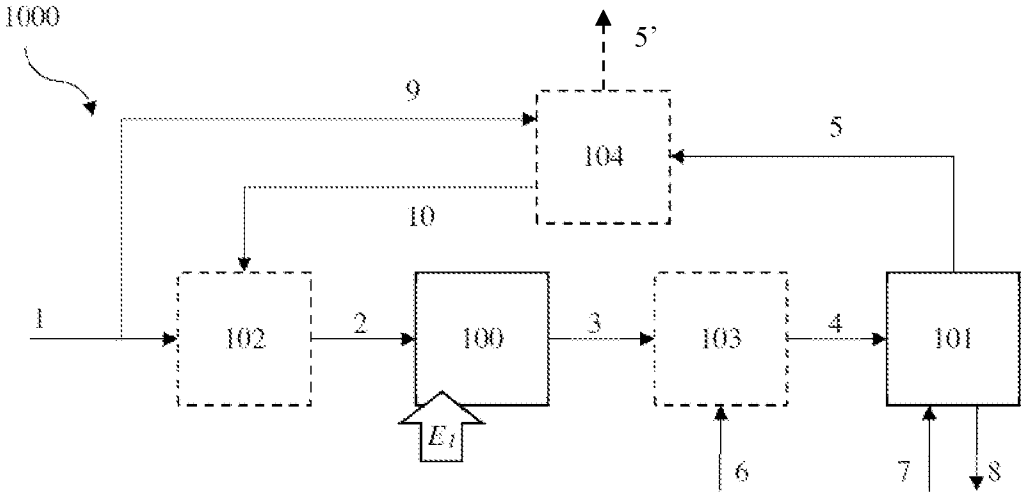
FIG. 1 is a block diagram representing, at 1000, a layout for a thermal energy production and storage facility configured to implement a method according to the embodiments.

FIG. 1 is a block diagram representing, at 1000, a layout for a high temperature thermal energy production and storage facility configured to implement a method according to the embodiments. Block diagram sections shown by dotted lines are optional.

For FIG. 1, the following designations are used for the members. Streams: 1. Feed; 2. Preheated feed or feed mixture; 3. Feed heated by virtue of a rotary apparatus (100); 4. Feed further heated in an additional (booster) heater unit configured to raise/enhance temperature through (exothermic) chemical reactions, for example; 5. Fluidic medium directed to heat recovery; 5'. Stream 5 after it has transferred its heat to stream 10; 6. Reactive compound or a mixture of reactive compounds, e.g. a reactive chemical or chemicals, or a support fuel used to increase temperature of the fluid/gas in the additional heater unit 103; 7. Heat transfer fluid entering a thermal energy storage unit 101 (indirect heater applications); 8. Heated process stream sent for further processing; 9. Feed stream to heat recovery; 10. Hot fluidic stream from heat recovery and/or recycled stream. Sections (units): 100. Rotary heater unit (rotary apparatus(es)); 101. Thermal energy storage unit; 102. Preheater unit; 103. Additional heating apparatus (booster heater unit); 104. Heat recovery unit.

Facility is configured to carry out an industrial process or processes related to high-temperature thermal energy production and storage at temperatures essentially equal to or exceeding 500 degrees Celsius (° C.).

In embodiments, facility 1000 is configured to carry out a process or processes related to thermal energy production and storage at temperatures within a range of 500-1700° C. In embodiments, facility 1000 is configured to carry out process(es) related to thermal energy production and storage which start at temperatures essentially within a range of about 800-900° C. or higher. In embodiments, facility 1000 is configured to carry out process(es) related to thermal energy production and storage at temperatures essentially equal to—or exceeding 1000° C. In embodiments, facility 1000 is configured to carry out process(es) related to thermal energy production and storage which start at temperatures essentially within a range of about 1100-1200° C. or higher. In embodiments, the facility is configured to carry out process(es) related to thermal energy production and storage at temperatures essentially equal to—or exceeding 1200° C. In embodiments, the facility is configured to carry out processes related to thermal energy production and storage at temperatures within a range of about 1300-1700° C. In embodiments, the facility is configured to carry out process (es) related to thermal energy production and storage at temperatures essentially equal to—or exceeding 1500° C. In embodiments, the facility is configured to carry out process (es) related to thermal energy production and storage at temperatures essentially equal to—or exceeding 1700° C. In some embodiments, the facility can be configured to carry out industrial process(es) related to thermal energy production and storage at temperatures that exceed 1700° C., such as at 2000° C. or higher, such as within a range of about 1700° C. to about 2500° C. The facility can be configured to carry out industrial process(es) related to thermal energy production and storage at about 1700° C., at about 1800° C., at about 1900° C., at about 2000° C., at about 2100° C., at about 2200° C., at about 2300° C., at about 2400° C., at about 2500° C., and at any temperature value falling in between the above-mentioned temperature points. It should be pointed out that facility 1000 is not excluded from carrying out of at least a part of industrial processes at temperatures below 500° C.

The thermal energy storage unit is designated by a reference numeral 101. The section 101 comprises a thermal energy storage medium (also referred to as a thermal energy storage material or a heat storage material). In some configurations the unit 101 further comprises a heat carrier (a heat transfer fluid, HTF). In embodiments, the heat storage material and the heat carrier may be one single medium or different substances.

In embodiments, the thermal energy storage medium provided within the at least one thermal energy storage unit 101 is configured as any one of: sensible heat storage (SHS) medium, latent heat storage (LHS) medium or thermochemical storage (TCS) medium. For SHS systems, any one of solid or liquid materials may be utilized, including, but not limited to metals, stone/rock, sand, concrete and ceramics (solids) and molten salts, water and oil (liquids), or any combination of these solid and liquid materials. Any one of synthetic—or mineral oils may be utilized.

Exemplary molten salts include, but are not limited to nitrate-based materials (e.g. mixtures of sodium nitrates, potassium nitrates and/or lithium nitrates), chloride-based materials (e.g. mixtures of sodium chlorides, potassium chlorides, magnesium chlorides and/or zinc chlorides), fluoride-based materials and carbonate-based materials.

For LHS systems, any suitable phase change material (PCM) may be utilized, including, but not limited to solid-solid, solid-liquid, solid-gas, and liquid-gas phase transition material species. Accordingly, any appropriate TCS system may be utilized.

In embodiments, the thermal energy storage medium is configured as a stable phase material composed of one or more phases, or a phase change material (PCM). In embodiments, the thermal energy storage medium is provided in any one of: a solid phase, a liquid phase, a gaseous phase, or any combination thereof. These solids, liquids, or gaseous compounds may be configured to undergo reversible reactions associated with capture and release of thermal energy upon formation and dissociation of chemical compounds, accordingly.

The heat storage medium may be a mobile medium, in which case it comprises a fluid, or an immobile medium. Mobile thermal energy storage medium may comprise or consist of a molten salt or a fluidized bed of materials, such as a fluidized sand bed. By way of example, mobile thermal energy storage systems may be conceived using PCM materials.

Immobile thermal energy storage medium may comprise or consist or any one of: metals, stone, concrete, sand, ceramics, or a combination thereof. The immobile heat storage medium may be configured for example as a fixed bed of material, such as a fixed sand bed, or as a rock bed.

The present disclosure offers apparatuses and methods for generating and storing thermal energy in the thermal energy storage unit 101 comprising the thermal energy storage medium, which thermal energy which may be subsequently used in industrial processes with high heat energy demand, whereby energy efficiency in said processes can be markedly improved and the amount of air pollutants released into the atmosphere is reduced. FIG. 1 schematically outlines these improved facility and method.

In embodiments, the method comprises generation of a heated fluidic medium by virtue of a rotary heater unit 100 comprising or consisting of at least one rotary apparatus, hereafter, the apparatus (100). For the sake of clarity, the rotary heater unit is designated in the present disclosure by the same reference number, 100, as the rotary apparatus. The rotary heater unit is preferably integrated into the process facility 1000. In embodiments, the heated fluidic medium is produced by the at least one rotary apparatus.

In embodiments, an amount of input energy $E_1$ is conducted into the at least one rotary apparatus 100 integrated, as a (rotary) heater unit, into the process facility 1000. The input energy $E_1$ preferably comprises electrical energy. In embodiments, the amount of electrical energy conducted as the input energy into the at least one rotary apparatus integrated in the thermal energy production and storage facility is provided within a range of about 5 to about 100 percent, preferably, within a range of about 50 to about 100 percent. Thus, the amount of electrical energy conducted as the input energy into the at least one rotary apparatus integrated in the thermal energy production and storage facility can constitute any one of: 5, 10, 15, 20, 25, 30, 35, 40, 45, 50, 55, 60, 65, 70, 75, 80, 85, 90, 95, and 100 percent (from the total energy input), or any intermediate value falling in between the above indicated points.

Electrical energy can be supplied from external or internal source. In practice, electrical input energy $E_1$ supplied into the apparatus can be defined in terms of electric power, the latter being defined as a rate of energy transfer per unit time (measured in Watt).

The rotary apparatus 100 is configured to receive a feed stream 1, hereafter, the feed 1. Overall, the feed 1 can comprise or consist of any fluid, such as liquid or gas, or a combination thereof, provided as a pure component or a mixture of components. The feed can be a feedstock gas, a process gas, a make-up gas (a so-called replacement/supplement gas), and the like. Gaseous feed can include inert gases (air, nitrogen gas, steam and the like) or reactive, e.g. oxygen, flammable gases, such as hydrocarbons, or any other gas like hydrogen and ammonia. Selection of the feed is process-dependent; that is, the nature of the thermal energy storage medium in the thermal energy storage unit 101 (and indeed a specific industry/an area of industry said thermal energy storage medium is assigned to) implies certain requirements and/or limitations on the selection of feed substance(s).

It is preferred that the feed 1 enters the apparatus 100 in essentially gaseous form. Preheating of the feed or conversion of liquid or essentially liquid feed(s) into a gaseous form can be performed in an optional preheater unit 102 configured as a (pre)heater apparatus or a group of apparatuses. In the preheater unit 102, the feed stream(s) originally provided in a gaseous form (e.g. the process gas or gases) can be further heated (e.g. superheated). In the preheater unit 102, the feed 1 can be vaporized if not already in gas form and optionally superheated.

The preheater unit 102 can be any conventional device/system configured to provide heat to a fluidic substance. In some configurations, the preheater unit 102 can be a fired heater, such as a direct-fired heat exchanger that uses hot combustion gases (flue gases) to raise the temperature of a fluidic feed, such as a process fluid, flowing through the coils arranged inside the heater. Additionally or alternatively, the preheater unit 102 can be configured to exploit energy made available by the other units in the thermal energy production and storage facility, as illustrated by feed stream 10 provided by heat recovery unit 104. The preheater unit 102 can thus be configured to utilize steam, electricity and/or waste/recycle heat streams.

The feed stream 1 used to produce the heated fluidic medium by virtue of the rotary heater unit (the apparatus 100) may comprise a virgin feed (fresh feed) and/or a recycle stream(s). Hence, the feed 1 may consist of any one of fresh feed, recycle (fluidic) stream, and a mixture thereof. Stream 2 representing (pre)heated feed may include, in addition to feed 1, all recycle streams, such as those arriving from a heat recovery section 104 (rf. stream 10).

In the rotary heater unit/the rotary apparatus 100, the temperature is raised to a level which is required by the thermal energy storage medium or to a maximum level achieved by the rotary apparatus. In an event the temperature rise achieved by the rotary apparatus 100 is not sufficient and/or if, for example, the temperature of the fluid needs to be raised again after it has transferred its heat to the thermal energy storage medium, further temperature rise can be achieved by virtue of arranging additional heater units (100B, 103), further referred to as “booster” heater(s), downstream of the rotary heater unit 100 (100A); rf. description to FIG. 2B. Each additional heater unit comprises or consists of an additional heating apparatus implemented according to the description below.

In heat storage applications, it may be feasible to recover heat from the process streams exiting the thermal energy storage medium (unit 101). Heat recovery section is indicated on FIG. 1 with ref no. 104. Recovered heat can be further used for heating the feed stream 1 (see stream 9 entering the heat recovery and stream 10 exiting the heat recovery) and/or a recycle stream (see streams 5 and 10, accordingly), reducing the additional thermal energy that must be inputted into a feed stream and increasing energy efficiency. The unit 104 may be further configured to capture excess heat from stream 5 exiting the heat storage unit 101 and to transfer it to feed stream 9 to form the heated feed stream 10. Stream 5 that has donated its heat to the stream 9 exits the unit 104 as stream 5'. The latter configuration is feasible to recover heat from streams (5) exiting the heat storage unit 101 if said streams are not suitable for being recycled back to the rotary apparatus 100 (for example, if the heat storage material is sand bed, and stream 5 is contaminated with dust particles).

Heat recovery may be arranged through collecting streams exiting the process unit 101 and recycling thermal energy of these streams to the preheater unit 102 and/or the rotary apparatus 100. The heat recovery installation 104 may be represented with at least one heat exchanger device (not shown). Heat exchangers based on any appropriate technology can be utilized. Heat recovery may be optional for heating feed gas if the heat is consumed elsewhere or if it is not possible to recover heat due to safety—or any other reason.

Heat recovery is optional for heating feed gas if the heat is consumed elsewhere or if it is not possible to recover heat due to safety or any other reason.

In the facility layout 1000, the heat recovery unit 104 can be arranged before and/or after the preheater 102. In the latter configuration, the heat recovery unit 104 is arranged to recover heat from the hot fluidic medium (stream 5) flowing from the heat storage unit 101, which may be further utilized to heat feed stream and recycle stream, as explained above. On the other hand, when the heat recovery unit 104 is arranged before the preheater 102, the feed 1 is first led to the unit 104 (as stream 9) and then returned to preheating 102 as stream 10. In such a case, unit 104 acts as a first preheater.

Heated fluidic medium required for thermal energy storage in the unit 101 is generated by virtue of at least one rotary apparatus 100.

In an embodiment, the heated fluidic medium is generated in the rotary apparatus 100, where an amount of thermal energy is added directly into fluidic medium propagated through said apparatus. The heated fluidic medium generated in the rotary apparatus is further supplied to the thermal energy storage unit 101 to transfer its heat to the thermal energy storage medium provided within said unit 101. In some configurations, the heat fluidic medium generated in the rotary apparatus is a heat transfer medium. In some other configurations, the heated fluidic medium generated in the rotary apparatus 100 may be used to (indirectly) heat the heat transfer medium (stream 7, FIG. 1) entering the heat storage unit 101 from elsewhere. In some configurations, heat transfer between the heated fluidic medium generated in the rotary apparatus and the heat storage medium (and optionally the heat transfer fluid) provided within the heat storage unit 101 is implemented via a heat exchanger (rf. 105, FIG. 3B).

The rotary apparatus 100 configured for generating the heated fluidic medium to be supplied into the high-temperature thermal energy production and storage facility according to the embodiments comprises a rotor comprising a plurality of rotor blades arranged into at least one row over a circumference of a rotor hub or a rotor disk mounted onto a rotor shaft, and a casing with at least one inlet and at least one exit, the rotor being enclosed within the casing. In the apparatus 100, an amount of thermal energy is imparted to a stream of fluidic medium directed along a flow path formed inside the casing between the inlet and the exit by virtue of a series of energy transformations occurring when said stream of fluidic medium passes through the at least one row of rotor blades when propagating inside the casing of the rotary apparatus, between the inlet and the exit, whereby a stream of heated fluidic medium is generated.

Implementation of the rotary apparatus 100 may generally follow the disclosures of a rotary reactor apparatus according to the U.S. Pat. No. 7,232,937 (Bushuev), —U.S. Pat. No. 9,494,038 (Bushuev) and U.S. Pat. No. 9,234,140 (Seppala et al), and of a radial reactor apparatus according to the U.S. Pat. No. 10,744,480 (Xu & Rosic), the entire contents of which are incorporated by reference herewith. Any other implementation, which can be configured to adopt the method according to the embodiments, can be utilized.

In the patent documents referenced above, the rotary turbomachine-type apparatuses were designed as reactors for processing hydrocarbons, in particular, for steam cracking. General requirements for these applications are: rapid heating of gases, high temperature, short residence time, and plug flow (a flow model which implies no axial mixing). These requirements have led to designs where the turbomachine type reactors have several heating stages accommodated in a relatively small volume.

The present disclosure is based on an observation that the rotary apparatus (including, but not limited to the ones referenced above) can be electrified and used as a heater to generate the heated fluidic medium further supplied in the high-temperature heat storage 101. By integration of the rotary apparatus heater unit(s) into the heat storage units and processes 101, significant reductions in greenhouse gas— and particle emissions can be achieved. By way of example, the rotary apparatus can replace fuel-fired heaters in a variety of applications (described hereinbelow). The temperature range can be extended from about 1000° C. (generally achievable with the above referenced reactor devices) to up to at least about 1700° C. and further up to 2500° C. Construction of the rotary apparatuses capable of achieving these high temperatures is possible due to an absence of aerodynamic hurdles.

The rotary apparatus 100 integrated into the high-temperature thermal energy production and storage facility according to the embodiments and configured to generate the heated fluidic medium for the method(s) according to the embodiment thus comprises the rotor shaft positioned along a horizontal (longitudinal) axis with at least one rotor unit mounted onto the rotor shaft. The rotor unit comprises a plurality of rotor (working) blades arranged over the circumference of a rotor hub or a rotor disk and together forming a rotor blade cascade. The rotary apparatus 100 thus comprises a plurality of rotor (working) blades arranged into at least one row over the circumference of a rotor hub or a rotor disk mounted onto the rotor shaft, and forming an essentially annular rotor blade assembly or rotor blade cascade.

In embodiments, the apparatus further comprises a plurality of stationary vanes arranged into an assembly disposed at least upstream of the at least one row of rotor blades. In this configuration, the rotary apparatus is operated such that the amount of thermal energy is imparted to a stream of fluidic medium directed along a flow path formed inside the casing between the inlet and the exit by virtue of a series of energy transformations occurring when said stream of fluidic medium passes through the stationary vanes and the at least one row of rotor blades, respectively, whereby a stream of heated fluidic medium is generated.

In some embodiments, the plurality of stationary vanes can be arranged into a stationary vane cascade (a stator), provided as an essentially annular assembly upstream of the at least one row of rotor blades. The stationary vanes arranged into the assembly disposed upstream of the at least one row of rotor blades may be provided as stationary guide vanes, such as (inlet) guiding vanes (IGV), and be configured, in terms of profiles, dimensions and disposition thereof around the central shaft, to direct the fluid flow into the rotor in a predetermined direction such, as to control and, in some instances, to maximize the rotor-specific work input capability.

The rotary apparatus can be configured with two or more essentially annular rows of rotor blades (rotor blade cascades) sequentially arranged on/along the rotor shaft. In such an event, the stationary guide vanes may be installed upstream of the first row of the rotor blades, upstream of each row of rotor blades in the sequence, or upstream of any selected row of rotor blades in a sequential arrangement of the latter.

In embodiments, the rotary apparatus 100 further comprises a diffuser area arranged downstream of the at least one row of rotor blades (rotor blade cascade). In this configuration, the rotary apparatus is operated such that an amount of thermal energy is imparted to a stream of fluidic medium directed along a flow path formed inside the casing between the inlet and the exit by virtue of a series of energy transformations occurring when said stream of fluidic medium successively passes through the stationary guide vanes, the at least one row of rotor blades and the diffuser area, respectively, whereby a stream of heated fluidic medium is generated. The diffuser area can be configured with or without stationary diffuser vanes. In some configurations, a vaned or vaneless diffuser is arranged, in said diffuser area, downstream of the at least one rotor blade cascade. In some configurations, the diffuser can be implemented as a plurality of stationary (stator) vanes arranged into a diffuser vane cascade, provided as an essentially annular assembly downstream of the rotor.

The rotor, the stationary guide vanes and the diffuser area are enclosed within an internal passageway (a duct) formed in the casing.

In some configurations, such as described for example in U.S. Pat. No. 10,744,480 to Xu and Rosic, provision of a diffuser (device) may be omitted, and the diffuser area may be represented with an essentially vaneless portion of the duct (a so-called vaneless space) located downstream of the rotor and configured, in terms of its geometry and/or dimensional parameters, to diffuse a high speed fluid flow arriving from the rotor.

Provision of the vaneless portion of the duct is common for all configurations of the rotary apparatus 100 described above. Depending on configuration, the vaneless portion (vaneless space) is arranged downstream of the rotor blades (rf. U.S. Pat. No. 10,744,480 to Xu and Rosic) or downstream of the diffuser vane cascade (rf. U.S. Pat. No. 9,494,038 to Bushuev and U.S. Pat. No. 9,234,140 to Seppala et al). In some configuration described for example by Seppala et al, arrangement of rotating and stationary blade rows in the internal passageway within the casing is such that vaneless portion(s) is/are created between an exit from the stationary diffuser vanes disposed downstream of the rotor blades and an entrance to the stationary guide blades disposed upstream of the rotor blades of a subsequent rotor blade cascade unit.

The terms "upstream" and "downstream" refer hereby to spatial and/or functional arrangement of structural parts or components with relation to a predetermined part—or component, hereby, the rotor, in a direction of fluidic flow stream throughout the apparatus (from inlet to exit).

Overall, the rotor with the working blade cascade can be positioned between the rows of stationary (stator) vanes arranged into essentially annular assemblies (referred to as cascades) at one or both sides of the working blade row.

Configurations including two or more rows of rotor blades/rotor blade cascades arranged in series (in sequence) on/along the rotor shaft may be conceived with or without stationary blades in between. In an absence of stationary vanes between the rotor blade rows, the speed of fluidic medium propagating through the duct increases in each subsequent row. In such an event, a plurality of stationary vanes may be arranged into assemblies upstream of a first rotor blade cascade in said sequence (as stationary guide vanes) and downstream of a lastmost rotor blade cascade (as stationary diffuser vanes).

The row of rotor blades (rotor blade cascade) and a portion of the duct downstream said rotor blades enclosed inside the casing optionally provided with an assembly of stationary diffuser vanes (diffuser area) may be viewed as a minimal process stage (hereafter, the stage), configured to mediate a complete energy conversion cycle. Hence, an amount of kinetic energy added to the stream of fluidic medium by at least one row of rotating blades is sufficient to raise the temperature of the fluidic medium to a predetermined value when said stream of fluidic medium exits the rotor blades and propagates, in the duct, towards a subsequent row of rotor blades, or enters the same row of rotor blades following an essentially helical trajectory formed within the essentially toroidal-shaped casing. The duct (which encloses the periphery of the rotor) is preferably shaped such, that upon propagation of the fluidic stream in the duct, the stream decelerates and dissipates kinetic energy into an internal energy of the fluidic medium, and an amount of thermal energy is added to the stream of fluidic medium.

The stationary guide blade row(s) disposed upstream of the at least one row of rotor blades prepare required flow conditions at the entrance of the rotating blade row (cascade) during the energy conversion cycle.

In some configurations, the process stage is established with the assembly of stationary guide vanes (upstream of the rotor blades), the row of rotor blades and the diffuser area arranged downstream of said rotor blades, the diffuser area provided as the essentially vaneless portion of the duct optionally supplied with diffuser vanes. During the energy conversion cycle, enabled with successive propagation of the stream of fluidic medium through the stationary guide vanes, the at least one row of rotor blades and the diffuser area, respectively, in a controlled manner, mechanical energy of the rotor shaft is converted into kinetic energy and further—into internal energy of the fluid, followed by the rise of fluid temperature. An amount of kinetic energy added to the stream of fluidic medium by rotating blades of the rotor is sufficient to raise the temperature of the fluidic medium to a predetermined value when said stream of fluidic medium exits the rotor blades and passes, inside the duct, through the diffuser area, whereupon the stream decelerates and dissipates kinetic energy into an internal energy of the fluidic medium, and an amount of thermal energy is added to the stream of fluidic medium. In the rotor blade row, the flow accelerates, and mechanical energy of the shaft and rotating blades is transferred to fluidic stream. In at least part of each rotor blade row the flow may reach a supersonic flow condition. In the diffuser area, the high speed fluid flow arriving from the rotor is diffused with the significant entropy increase, whereby the flow dissipates kinetic energy into the internal energy of the fluidic substance, thus providing thermal energy into the fluid. If the flow upstream of the diffuser is supersonic, the kinetic energy of the fluidic stream is converted into internal energy of the fluid through a system of multiple shocks and viscous mixing and dissipation. An increase in the internal energy of the fluid results in a rise of fluid temperature. The energy conversion function may be performed by the vaneless portion of the duct located downstream of the rotor blades (rf. U.S. Pat. No. 10,744,480 to Xu & Rosic) and/or by an assembly of diffusing vanes, for example (rf. U.S. Pat. No. 9,234,140 to Seppala et al).

The rotary apparatus 100 can be configured as a multi-stage- or a single-stage solution. Multistage configurations can be conceived comprising a number of rotor units (e.g. 1-5 rows of rotor blades sequentially arranged on/along the rotor shaft) alternating with common diffuser area(s) (vaneless or vaned). In an exemplary configuration outlined in U.S. Pat. No. 9,234,140 to Seppala et al, the rotary apparatus 100 can be implemented substantially in a shape of a ring torus, where a cross-section of the duct in the meridian plane forms a ring-shaped profile. The apparatus comprises a rotor unit disposed between stationary guide vanes (nozzle vanes), and stationary diffusing vanes. The stages are formed with rows of stationary nozzle vanes, rotor blades and diffusing vanes, through which the fluidic stream propagates, in a successive manner, following a flow path established in accordance with an essentially helical trajectory. In this configuration, fluidic stream circulates through the rotating rotor blade cascade a number of times while propagating inside the apparatus between the inlet and the exit. Similar ring-shaped configuration is described in U.S. Pat. No. 9,494,038 to Bushuev.

In another exemplary configuration outlined in U.S. Pat. No. 9,234,140 to Seppala et al, the rotary apparatus 100 can be configured as an essentially tubular, axial-type turbomachine. In such configuration, the apparatus comprises an extended (elongated) rotor hub, along which a plurality of rotor blades is arranged into a number of sequential rows. The rotor is enclosed within the casing, inner surface of which is provided with the stationary (stator) vanes and diffuser vanes, arranged such that blades/vanes of the stator, rotor—and diffuser cascades alternate along the rotor hub in a longitudinal direction (along the length of the rotor shaft, for inlet to exit). Blades of the rotor cascade at certain position along the rotor in the longitudinal direction form the stage with the adjacent pairs of stationary guide (nozzle) vanes and diffusing vanes, respectively.

In described configurations, the subsequent stages have blade/vane-free space between them.

In still another exemplary configuration outlined in U.S. Pat. No. 10,744,480 to Xu and Rosic, the rotary apparatus 100 can be configured as a radial turbomachine that generally follows a design for centrifugal compressors or centrifugal pumps. The term "centrifugal" implies that fluid flow within the device is radial; therefore, the apparatus may be referred, in the present disclosure, as a "radial-flow apparatus. The apparatus comprises a number of rotor units mounted onto elongated shaft, wherein each rotor unit is preceded with stationary guide vanes. A vaneless portion of the duct shaped in a manner enabling energy conversion (U-bend or S-bend, for example) is located after the rotor unit(s). Additionally, configuration may comprise a separate diffuser device (vaned or vaneless) disposed downstream of the rotor.

In all configurations described above, the rotary apparatus 100 performs, in the method disclosed herein, in similar manner. In operation, the amount of input energy conducted into the at least one rotary apparatus integrated into the thermal energy production and storage facility is converted into mechanical energy of the rotor. Conditions in the rotary apparatus are adjusted such, as to produce flow rate conditions, at which an amount of kinetic energy added to the stream of fluidic medium by rotating blades of the rotor is sufficient to raise the temperature of the fluidic medium to a predetermined value when said stream of fluidic medium exits the at least one row rotor blades and passes through the duct and/or through the diffuser area to enter the subsequent row of rotor blades or the same row of rotor blades in accordance to the description above. The row(s) of rotor blades may be preceded with stationary guide vanes. Hence, the adjustable condition comprises adjusting at least a flow of fluidic medium propagating inside the casing of the rotary apparatus, between the inlet and the exit. Adjusting the flow may include adjusting such apparatus operation related parameters, as temperature, mass flow rate, pressure, etc. Additionally or alternatively, flow conditions can be adjusted by modifying shape of the duct formed inside the casing.

In some exemplary configurations, the rotary apparatus can be configured to implement a fluidic flow between its inlet(s) and outlet(s) along a flow path established in accordance with any one of: an essentially helical trajectory formed within an essentially toroidal-shaped casing, as discussed in any one of the patent documents U.S. Pat. No. 9,494,038 to Bushuev and U.S. Pat. No. 9,234,140 to Seppala et al; an essentially helical trajectory formed within an essentially tubular casing, as discussed in the patent document U.S. Pat. No. 9,234,140 to Seppala et al; an essentially radial trajectory as discussed in the patent document U.S. Pat. No. 10,744,480 to Xu & Rosic; and along the flow path established by virtue of the stream of fluidic medium in the form of two spirals rolled up into vortex rings of right and left directions, as discussed in the patent document U.S. Pat. No. 7,232,937 to Bushuev). The aerodynamic design of the rotary apparatus can vary.

The rotary apparatus utilizes a drive engine. Overall, the apparatus can utilize various drive engines, such as electric motors, or it can be directly driven by gas—or steam turbine, for example, or any other appropriate drive device. For the purposes of the present disclosure, any appropriate type of electric motor (i.e. a device capable of transferring energy from an electrical source to a mechanical load) can be utilized. Suitable coupling(s) arranged between a motor drive shaft and the rotor shaft, as well as various appliances, such as power converters, controllers and the like, are not described herewith.

The rotary heater unit (100) may comprise a number of rotary apparatus units arranged in parallel, for example. These units may be connected to a common thermal energy storage medium (directly or indirectly, e.g. through a number of heat exchangers), such as a furnace, for example.

In some configurations, a number of rotary apparatus units can be connected to several thermal energy storage mediums. Different configurations may be conceived, such as n+x rotary apparatuses connected to n storage mediums, wherein n is equal to or more than zero (0) and x is equal to or more than one (1). Thus, in some configurations, the facility 1000 and, in particular, the rotary heater unit 100, may comprise one, two, three or four parallel rotary apparatus units connected to the common storage medium, for example; the number of rotary apparatuses exceeding four (4) is not excluded. When connecting, in parallel, a number of rotary apparatuses to the common thermal energy storage medium, one or more of said apparatuses 100 may have different type of drive engine, e.g. the electric motor driven reactor(s) can be combined with those driven by steam turbine, gas turbine and/or gas engine.

Electric power (defined as the rate of energy transfer per unit time) can be supplied into the rotary apparatus through supplying electric current to the electric motor used to propel a rotary shaft of the apparatus. Supply of electric power into the rotary apparatus can be implemented from an external source or sources (as related to the rotary heater unit/the apparatus 100 and/or the thermal energy production and storage 1000). Additionally or alternatively, electrical energy can be produced internally, within the facility 1000.

An external source or sources include a variety of supporting facilities rendered for sustainable energy production. Thus, electric power can be supplied from an electricity generating system that exploits at least one source of renewable energy or a combination of the electricity generating systems exploiting different sources of renewable energy. External sources of renewable energy can be provided as solar, wind—and/or hydropower. Thus, electric power may be received into the process from at least one of the following units: a photovoltaic electricity generating system, a wind-powered electricity generating system, and a hydroelectric power system. In some exemplary instances, a nuclear power plant may be provided as the external source of electrical power. Nuclear power plants are generally regarded as emission-free. The term "nuclear power plant" should be interpreted as using traditional nuclear power and, additionally or alternatively, fusion power.

Electricity can be supplied from a power plant that utilizes a turbine as a kinetic energy source to drive electricity generators. In some instances, electric power to drive the at least one apparatus 100 can be supplied from at least one gas turbine (GT) provided as a separate installation or within a cogeneration facility and/or a combined cycle power facility, for example. Electric power can thus be supplied from at least one of the following units: a combined cycle power facility, such as a combined cycle gas turbine plant (CCGT), and/or a cogeneration facility configured for electricity production combined with heat recovery and utilization through combined heat and power (CHP), for example. In some examples, the CHP plant can be a biomass fired plant to increase the share of renewable energy in the process described. Additionally or alternatively, supply of electric power can be realized from a spark ignition engine, such as a gas engine, for example, and/or a compression engine, such as a diesel engine, for example, optionally provided as a part of an engine power plant. Still further, any conventional power plant configured to produce electrical energy from fossil raw materials, such as coal, oil, natural gas, gasoline, and the like, typically mediated with the use of steam turbines, can be used to generate electrical energy as an input energy for the rotary apparatus 100. Also hydrogen can be utilized as a source of renewable energy, to be reconverted into electricity, for example, using fuel cells.

Any combination of the abovementioned sources of electric power, realized as external and internal sources, may be conceived. Importing low emission electric power from an alternative (external) source improves energy efficiency of the thermal energy production and storage facility.

Conducting input energy, comprising electrical power, into a drive engine of the rotary apparatus can be further accompanied with conducting mechanical shaft power thereto from a power turbine, for example, optionally utilizing thermal energy generated elsewhere in the facility 1000 or outside said facility. Shaft power is defined as mechanical power transmitted from one rotating element to another and calculated as a sum of the torque and the speed of rotation of the shaft. Mechanical power is defined, in turn, as an amount of work or energy per unit time (measured in Watt).

In practice, the shaft power from the electric motor and the power turbine, for example, can be divided so that any one of those can provide the full shaft power or a fraction of it.

FIG. 2 and FIGS. 3A-3C show exemplary layouts for the rotary apparatus 100 representing the rotary heater unit or units within the facility 1000 with regard to preheater unit 102, temperature booster section 103, and heat recovery unit 104. The following citations are used for the members: 100, 100A, 100B—Rotary heater unit(s) (rotary apparatus(es)); 101—Heat-storage unit; 102—Preheater unit; 103—Additional heating apparatus (booster heater); 105—Heat exchanger device for indirect heating.

Figure 2:
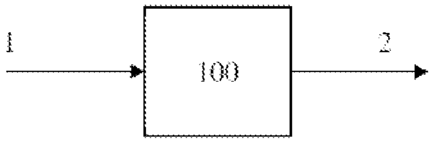
FIG. 2 is a schematic representation of a rotary apparatus, according to the embodiments.

FIG. 2 schematically illustrates a basic implementation for the rotary apparatus 100 configured to input heat into a stream of fluidic medium (feed stream 1) directed therethrough. Heated stream exiting the apparatus 100 is designated with reference number 2, respectively. In basic implementation, the rotor system of the rotary apparatus 100 is aerodynamically configured so that a volume of fluid is heated to a predetermined temperature while propagating along the flow path formed in the casing of the apparatus 100, between inlet and exit (so called "one-pass" implementation). The apparatus 100 enables temperature rise (delta T, ΔT) within a range of about 10° C. to about 120° C., in some configurations—up to about 500° C., in one stage. Hence, in case of a multistage implementation, the fluid can be heated to 1000° C. in "one-pass" implementation (taken 100° C. temperature rise per stage in a 10-stage apparatus). Since residence time the fluidic medium spends to pass through the apparatus stage is in scale of fractions of seconds, such as about 0.01-1.0 milliseconds, fast and efficient heating can be achieved already in the basic configuration. Temperature rise can be optimized as required.

Figure 3A:
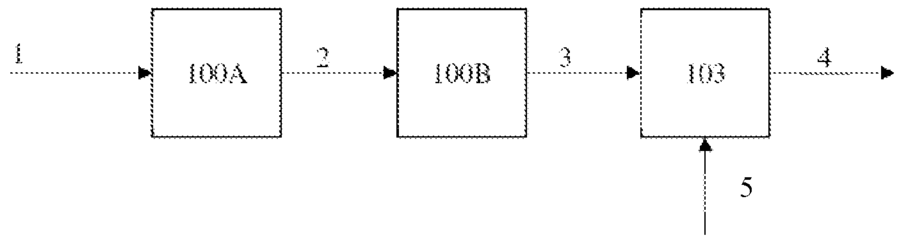
FIGS. 3A-3C are schematic representations of an apparatus or apparatuses for thermal energy production, according to the embodiments.

FIG. 3A illustrates a basic concept involving so-called booster heating. Booster heating is an optional method to heat a fluidic medium, such as a process gas, for example, beyond capability of a standalone heater apparatus 100.

Temperature boost may be viewed as thermal, chemical or both. In a first configuration (a) also referred to as a "thermal boost", an additional rotary heater apparatus (designated as 100B on FIGS. 3A, 3B and 3C) is arranged downstream of a "primary" rotary heater apparatus (designated as 100A on FIGS. 3A, 3B and 3C). Apparatuses 100A, 100B are generally recognized, within the present disclosure, as rotary heater units 100. Generation of the heated fluidic medium is can thus be achieved by provision of at least two sequentially connected rotary apparatuses 100A, 100B, wherein the stream of fluidic medium (rf. feed stream 1) is heated to a predetermined temperature in at least a first rotary apparatus (100A) in a sequence, referred to hereby as a primary heater, and wherein said stream of fluidic medium (rf. stream 2) is further heated in at least a second rotary apparatus (100B) in the sequence by inputting an additional amount of thermal energy into the stream of fluidic medium "preheated" in the first rotary apparatus 100A and propagating through the second rotary apparatus 100B (rf. stream 3). The apparatus 100B is therefore referred to as a booster heater. The apparatuses 100A, 100B may be identical and vary in terms of size or internal design. A sequence of two or more booster apparatuses such as 100B can be arranged after a primary heater 100A. Booster apparatuses can be arranged in parallel or in series, or in any combination that allows for optimization of rotating speed and aerodynamics thereof.

In a second, additional or alternative, configuration (further referred to as "chemical boost"), the additional heating apparatus designated as 103 (FIGS. 1, 2B) is adapted to receive, into the stream of fluidic medium propagating therethrough, reactive components 5, such as for example combustible fuel, to provide heat by exothermic reactions prior to directing said stream of fluidic medium to heat storage 101. In this configuration, temperature boosting can be achieved by virtue of introducing (e.g. by injecting) a reactive chemical or chemicals 5 into to the stream of fluidic medium directed through the additional heater unit/heating apparatus 103. It is noted that stream 5 of FIG. 2B corresponds to stream 8 shown on FIG. 1.

The reactive chemical-based booster heater unit 103 may be located after the thermal booster heater unit 100, 100B (FIG. 3A) or directly after the primary heater 100, 100A (FIG. 1). The reactive chemical (reactant) 5 (FIG. 3A) may include combustion gases, such as hydrogen gas, hydrocarbons, ammonia, oxygen, air, other gas and/or any other appropriate reactive compound, optionally a catalyst. In the unit 103, by virtue of exothermic reactions, the fluidic stream can be heated to a level, which is typically not possible to achieve by a single rotary apparatus not involving chemical-mediated heating (rf. stream 4). For example, a fuel gas, such as hydrogen, can be introduced into an oxygen-containing process gas, such as air. At elevated temperatures, hydrogen and oxygen enter an exothermic reaction to produce water molecules (hydrogen combustion).

Fuel gas can be injected into the booster heater unit 103 through burners along with air (or enriched oxygen) to rise the temperature of gases. Any reactive gases can be injected to generate heat if feasible.

The additional heater 103 adapted for chemical boost may be configured as a piece of pipe or as a chamber where exothermic reactions take place, and/or it can comprise as at least one rotary apparatus 100 arranged to receive reactive compounds to accommodate exothermic reactions to produce additional heat energy. The booster section 103 can thus comprise at least one rotary apparatus 100. Optionally, the reactive chemicals can be injected directly to the heat consuming process 101 (not shown). Additionally or alternatively, the reactive chemical mediated boost can be implemented in a single apparatus 100, 103, modified accordingly.

In an arrangement involving booster heating, the temperature of the stream of fluidic medium preheated to a predetermined temperature in a first rotary apparatus (100A) can be further raised to a maximum limit in subsequent heater units (100B, 103). By way of example, the temperature of the stream of fluidic medium preheated to about 1700° C. in a primary heater (100A) can be further raised in subsequent heater units (100B, 103) up to 2500° C. and beyond.

Mentioned concepts can be used separately or in combination, so that the reactive chemical 5 can be introduced into any one of the apparatuses 100 connected in parallel or in series (in sequence). Provision of the booster heater(s) is optional.

In additional or alternative configurations, preheating and additional heating can be implemented in the same apparatus 100 (not shown). This can be achieved in multistage configurations, comprising a number of rotor units (e.g. 1-5 rows of rotor blades sequentially arranged on/along the rotor shaft) alternating with common diffuser area(s) (vaneless or vaned).

Additionally or alternatively, booster heating can be used for example in an event, when the temperature of the fluid once heated in the rotary apparatus(es) 100, needs to be raised again after it has transferred its heat to the heat storage unit/process 101 (not shown).

Figure 3B:
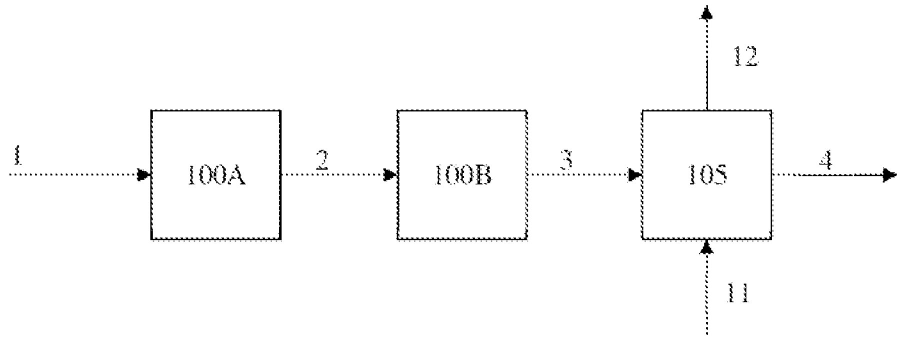
Figure 3C:
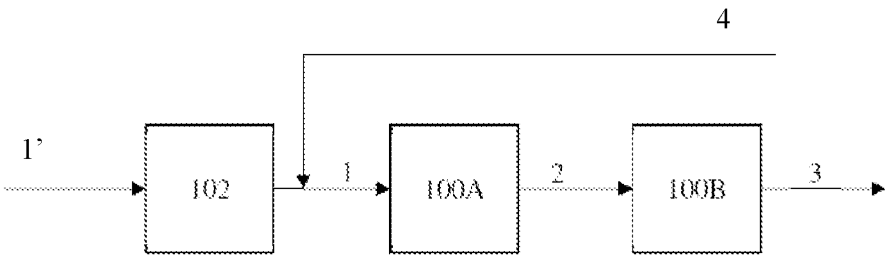

Upon connecting the at least two rotary apparatuses, such as 100A, 100B, and optionally 103 (in an event 103 is implemented as a rotary apparatus 100) in parallel or in series, a rotary apparatus assembly can be established (see for example FIGS. 3A-3C). Connection between the rotary apparatuses 100 implemented as "primary" heater(s) 100A or "booster" heater(s) 100B, 103 can be mechanical and/or functional. Functional (in terms of achievable heat input, for example) connection can be established upon association between at least two individual, physically integrated- or non-integrated individual apparatus units. In a latter case, association between the at least two rotary apparatuses can be established via a number of auxiliary installations (not shown). In some configurations, the assembly comprises the at least two apparatuses connected such, as to mirror each other, whereby said at least two apparatuses are at least functionally connected via their central (rotor) shafts. Such mirrored configuration can be further defined as having the at least two rotary apparatuses 100 mechanically connected in series (in a sequence), whereas functional connection can be viewed as connection in parallel (in arrays). In some instances, the aforesaid "mirrored" arrangement can be further modified to comprise at least two inlets and a common exhaust (discharge) module placed essentially in the center of the arrangement.

Rotary apparatuses (100A, 100B, 103, rf. FIG. 3A) can be assembled on the same (rotor) shaft. Each rotary apparatus can be optionally provided with a separate drive (a motor) which allows independent optimization of the apparatuses. When two or more separate rotary apparatuses are used, construction costs (materials etc.) can be optimized in view of operation temperature and pressure.

Additionally or alternatively, at least one rotary apparatus within the assembly can be designed to increase pressure of the fluidic stream. Hence, the at least one rotary apparatus in the assembly can be assigned with a combined heater and blower functionality.

Additionally or alternatively, a stream containing reactive or inert gases (such as stream 6 of FIG. 1) can be fed to the rotary apparatus 100 or to any equipment downstream of said apparatus (not shown).

FIG. 3B illustrates the rotary apparatus 100 with indirect process heating. The rotary apparatus can be used for indirect heating of fluids in heat exchangers 105. Type of heat exchanger can be selected as needed for optimal heat transfer.

Heating gas (see streams 1-3) can be selected to be most suitable for heating and safety (for example: steam, $N_2$, air). Gas heated in the rotary apparatus 100 may thus be used to transfer its heat to a "cold" stream of heat transfer fluid 11 entering the heat exchanger from elsewhere to generate a heated stream of heat transfer fluid 12 to be further used in the heat storage unit 101 (not shown). Alternatively, the heat storage unit 101 can be configured as a "heat exchanger" (rf. FIG. 1), to receive the heated gas flowing from the rotary apparatus (1-4) and the heat transfer fluid as a separate stream 7.

Gas heated in the rotary apparatus 100 can be close to atmospheric pressure or pressure can be raised to improve heat transfer). Using the rotary apparatus allows for optimization of a temperature difference in the downstream heat exchanger, which further allows for minimizing the size of heat exchanger and for avoiding possible unwanted reactions (fouling, coking) in heat exchanger surface due too high surface temperature. In process heaters high surface temperatures may cause excess fouling in process heaters. Indirect heating can be used, for example, to replace process heaters in oil refining for the evaporation of heavy streams where also operating pressure is normally low.

FIG. 3C illustrates the rotary heater apparatus 100 (100A) with a preheater 102 and with a recycle process fluid (stream 4) recycled from the transfer of thermal energy to the thermal energy storage medium 101 (not shown). Preheater can be electric, fired, combustion engine, gas turbine, etc. or it can be a heat exchanger for recovering excess heat from any high temperature flow in the process. Provision of the preheater 102 is optional. The concept can further include an optional booster heater 100B downstream of the apparatus 100A. Thermal or chemical booster heating may be utilized. Stream 1' designates a (feed) fluid sent to the preheater 102. Said fluid is further propagated through the rotary apparatuses 100A, 100B, where the feed is heated and sent to heat storage at stream 3.

Any one of the rotary apparatuses 100A, 100B can be equipped with a fluid recycle arrangement (see stream 4, FIG. 3C). Any combination of the rotary apparatuses the fluid recycle arrangement can be conceived. Recycling of fluidic stream is made possible through recirculation of the stream of fluidic medium by the at least one rotary apparatus.

In some configurations, the rotary apparatus 100 can utilize flue gases with low oxygen content possibly generated in and exhausted from the heat storage process (101). In such an event, hot flue gases exhausted from the fired heater are mixed with recycle gases (stream 4, FIG. 3C) to be used for heating in the rotary heater 100, 100A. Oxygen content in the flue gases used in described case is preferably below a flammability limit to provide safe heating.

FIGS. 4-8 illustrate the uses of a rotary apparatus 100 in high temperature thermal energy storage applications.

As used herein, "thermal energy storage" is the process of first transferring thermal energy (heat) from a heat source into storage, and then recovering the stored heat into a heat sink. Depending on the application, the material and phase of the heat source, storage medium, and heat sink may differ from one another.

Figure 4:
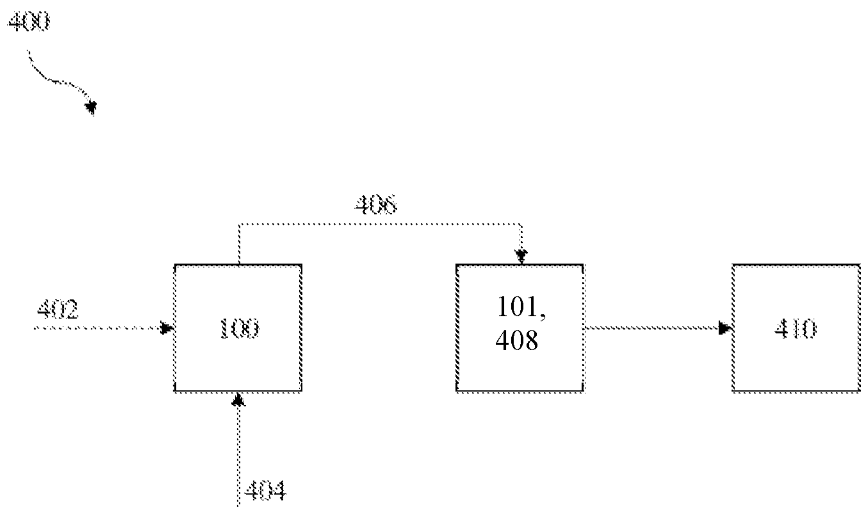
FIGS. 4-8 are schematic representations of methods of thermal energy storage and recovery according to the embodiments.

FIG. 4 illustrates one embodiment of a thermal energy production and storage process 400 in accordance with the present disclosure. An energy source 402 is used to power the rotary apparatus 100. In an embodiment, energy source 402 is renewable energy and may be available only intermittently. Rotary apparatus 100 accepts a heat transfer gas 404, such as air or another gas, and heats the heat transfer gas 404 as described above. The heated gas 406 is passed to a thermal energy storage unit 101 comprising a thermal energy storage medium 408, transferring the heat from the heated gas 406 to the thermal energy storage medium 408. The thermal energy stored in the thermal energy storage medium 408 may be released at a subsequent time in an industrial process 410.

Heat storage mediums suitable for major industrial applications include low-cost materials with high temperature tolerance, including temperatures up to 1000° C. Such a medium enables construction of high-volume and high-temperature heat storage facilities with reduced cost. Some exemplary embodiments of suitable low-cost storage media include rock, sand, concrete, and/or molten salt.

Incorporation of the rotary apparatus 100 in the process of thermal energy production and storage requires that the heat carrier (heat transfer fluid, HTF) is a gaseous heat carrier. An inert gas such as air, nitrogen or steam can be heated by the rotary apparatus and subsequently convey the heat generated by the rotary apparatus into a thermal storage medium. Any other gas may be utilized where appropriate.

One embodiment of a heat sink is high temperature, high pressure steam that can deliver thermal energy to, for example, a steam turbine that can power a compressor or an electricity generator. One embodiment of a low temperature heat sink would be municipal heating where high thermal energy requirements often do not coincide with the availability of renewable electricity, making thermal energy storage of thermal energy produced by renewable electricity a valuable improvement over existing systems.

In sensible high temperature heat storage (SHTHS) applications, for example, the temperature of a liquid or solid heat storage medium (e.g. sand, pressurized water, molten salts, oil, ceramics, rocks) is increased, imparting thermal energy to the storage medium. This thermal energy may be subsequently released for use in high temperature applications requiring temperatures above 100° C. The amount of thermal energy stored in the medium is proportional to the density, specific heat, volume, and temperature variation of the medium.

In some embodiments, the rotary apparatus 100 can act as a heater for the thermal energy storage medium (101, FIG. 1; 408, FIG. 4) by blowing heated gas over the storage medium thus inducing thermal energy transfer to the storage medium. In one embodiment, the rotary apparatus 100 is configured to generate thermal energy for transferring and storing thermal energy in hot rock, sand or concrete. In some embodiments, the rotary apparatus 100 utilizes electricity produced from renewable sources (wind, solar), as an input energy, which makes its application commercially viable, particularly during peak electricity demand time periods. By utilizing a rotary apparatus as described herein, (high temperature) thermal energy storage could act as a buffer between a low-cost, intermittent renewable electricity and a constant thermal energy flow required by, for example, process industry applications.

In some embodiments, the rotary apparatus 100 can generate fluids that reach high temperatures (up to 1700° C.), which in turn enables a transfer of a greater amount of thermal energy to the heat storage medium per a specific volume of said heat storage medium. Subsequently, the thermal energy can be recovered at higher temperatures. By generating and storing greater excess of thermal energy, applications such as high-pressure steam generation or conversion of thermal energy into electricity via steam turbines become more feasible and cost-effective to achieve.

In some embodiments, the rotary apparatus 100 is further configured to increase pressure of the gaseous medium that enters the rotary apparatus, along with the increase in thermal energy described above. High-temperature and high-pressure gaseous medium passes more easily through larger-sized or more dense beds, layers, or volumes of heat storage material.

In some embodiments, the rotary apparatus 100 is configured to impart thermal energy to the gaseous heating medium (heat transfer medium) after said gaseous medium has released its thermal energy into the heat storage medium. Recycling of the gaseous medium improves thermal efficiently of the system, accordingly. Since thermal energy transfer from the gaseous heat transfer medium (heated in the apparatus 100) to the heat storage medium is often imperfect, the recycled gaseous heat transfer medium contains residual thermal energy and so recovery of heat stored in this once used heat carrier can be enabled. An amount of energy needed for heating the recycled gas can be reduced, accordingly.

In some embodiments, the rotary apparatus 100 is configured to selectively utilise renewable electricity for thermal energy generation, such as high temperature heat generation, depending on the rate of renewal electricity generation and on the overall electrical energy demand. This allows the rotary apparatus to preferentially use renewable electricity during time periods when the renewable energy is at its peak production rates, i.e. when availability is the highest and the electricity price is the lowest. By enabling this selective utilization, high temperature heat generation may be maintained at levels needed for a particular application, while maximizing economic benefits of renewal energy production.

The process of thermal energy transfer from the gaseous heat transfer medium produced by the rotary apparatus 100 to heat storage medium, and from heat storage medium—to the heat sink, such as steam, differs dependent on the nature of the heat storage medium and its phase. If the heat storage medium is a mobile medium, such as a fluid (e.g. molten salt) or a fluidised sand bed, the heat storage medium can be divided to a hot storage and a cold storage. During thermal energy exchange between the gaseous heat transfer medium (flowing from the apparatus 100) and the fluidic heat storage material, the fluidic storage medium flows from the cold storage to the hot storage and is heated in a direct or indirect heat exchanger positioned between the hot and cold storages. During release/recovery of the thermal energy, the storage medium flows from the hot storage to the cold storage and transfers its heat to the heat sink in a direct or indirect heat exchanger. If the storage medium is an immobile medium, such as concrete, a fixed sand bed, or a rock bed, the thermal energy transfer from the heat source and to the heat sink can take place in a heat transfer tube network that is immersed in the bed, or by directly passing the hot and cold gases through the bed in heat charging and heat release phases, respectively.

FIGS. 5-8 illustrate heat charge and heat release cycles for a mobile (fluidic) heat storage medium and immobile heat storage medium.

Figure 5:
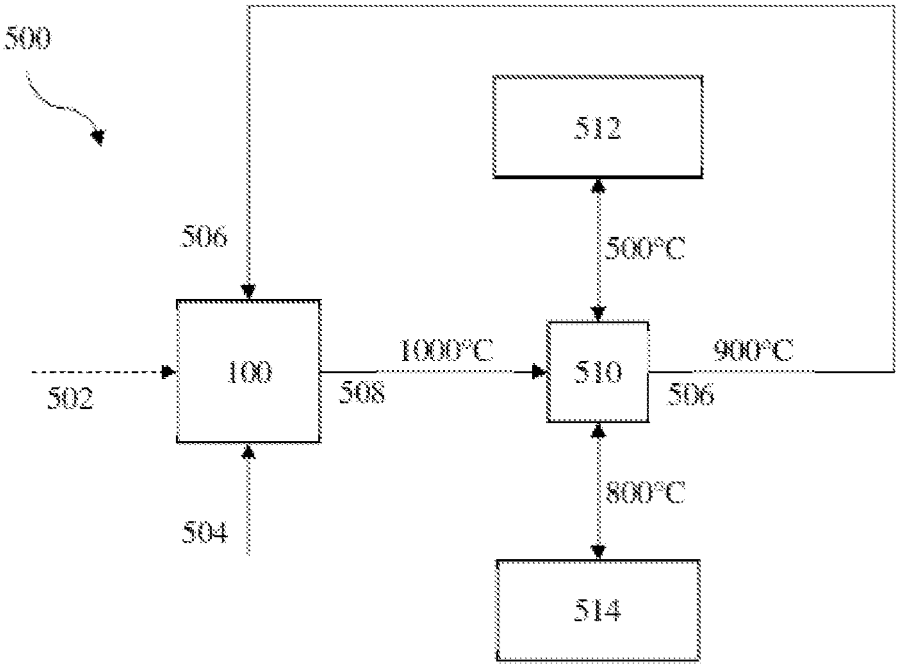

FIG. 5 illustrates an exemplary thermal energy production and storage cycle 500. An energy source 502 provides electricity to the rotary apparatus 100. In some embodiments, the energy source 502 is a renewable energy source. In some embodiments, the energy source 502 is composed of electrical energy from multiple sources, such as renewable energy and electricity from a municipal grid. As described above, the amount of renewable energy relied upon in generating thermal energy may fluctuate depending on the rate and efficiency of renewable energy production. Thus, energy source 502 may include a variety of electrical energy sources, in a variety of ratios, and may vary based on secondary factors such as time of day, circumstantial energy demands of a municipal grid, the weather (in situations where solar and/or wind energy is available).

The rotary apparatus 100, powered by the energy source 502, accepts a gaseous heating medium 504 and a recycled gaseous heating medium 506. In some embodiments, the gaseous heating medium is air or (water) steam. In other embodiments, the gaseous heating medium is exhaust gases or recycle gases from a thermal energy generating process. Through the heating operation performed in the rotary apparatus 100, described above, a heated gaseous medium 508 is produced. The heat gaseous medium 508 is further referred to as a heat carrier or a heat transfer fluid. In some embodiments, the heated gaseous medium 508 has a temperature of about 1000° C., although the temperature of the heated gaseous medium may vary depending on the available energy source, the temperature of the recycled gaseous medium, the needs of the particular application, or the like.

Heated gaseous medium 508 passes to heat exchanger 510. Heat exchanger 510 is thermally connected to cold storage 512 and hot storage 514, and a fluidic storage medium flows from the cold storage 512 to the hot storage 514 by way of the heat exchanger 510. Thus, during a heating cycle, thermal energy of the gaseous heating medium 508 is transferred to the fluidic heat storage medium 512, 514 through the heat exchanger 510. In some embodiments, the heat exchanger 510 is a conventional radiator-style exchanger with the fluidic storage medium in pipes having a high surface area with the gaseous heating medium passing over the pipes.

Upon thermal energy transfer from the gaseous heating medium to the fluidic storage medium, the cold storage 512 may have, for example, a temperature of about 500° C., and the hot storage 514 may have, for example, a temperature of about 800° C. After thermal energy transfer, the heated gaseous medium exits the heat exchanger 510 having a reduced temperature, such as about 900° C., and is recycled to the rotary apparatus 100.

Figure 6:
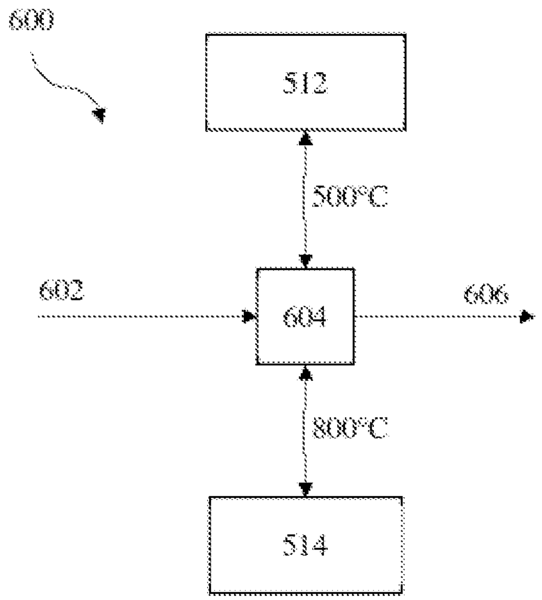

FIG. 6 illustrates an exemplary thermal energy release cycle 600 for a high temperature thermal energy storage system with a mobile (fluidic) storage medium. In some embodiments, such as the embodiment illustrated in FIG. 6, the release cycle 600 may include release of thermal energy after the thermal energy production and storage process 500 illustrated in FIG. 5. A feed water 602 is passed across heat exchanger 604. Feed water 602 may be any suitable water source. In an exemplary embodiment, feed water 602 is a boiler feed water having a pressure between about 60 bar to about 100 bar and a temperature of around 270° C. Heat exchanger 604 is positioned between cold storage 512 and hot storage 514 and operates in a similar manner to heat exchanger 510 in FIG. 5. As feed water 602 passes across heat exchanger 604, thermal energy stored in fluidic storage medium in the hot storage 514 is transferred to the feed water, vaporizing it. Superheated steam 606 exits the heat exchanger. In an exemplary embodiment, superheated steam 606 has a pressure of between about 60 bar and about 100 bar and a temperature of about 450° C.

In FIGS. 5 and 6, the hot storage and the cold storage may be in the form of, for example, molten salt, fluidised sand, or any other appropriate storage material. In presented examples, heat storage sections 512 and 514 collectively represent a heat storage unit 101 (FIG. 1).

Figure 7:
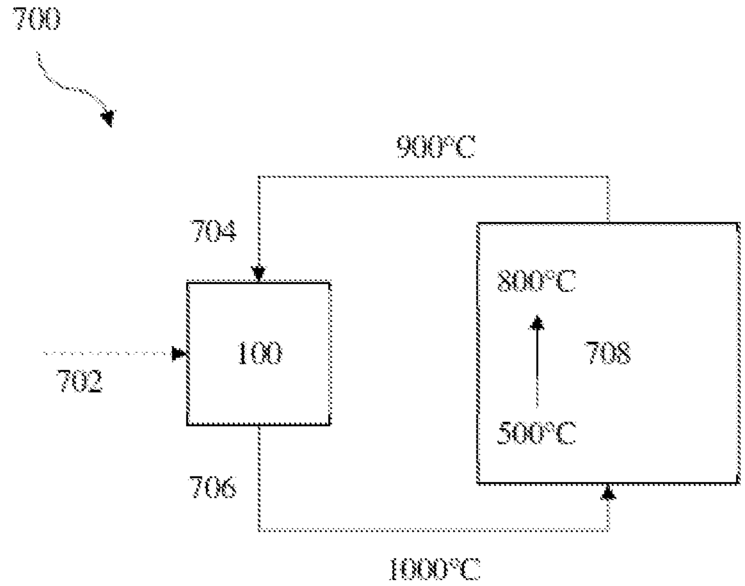

FIG. 7 illustrates an exemplary thermal energy production and storage cycle 700 utilising an immobile storage medium. An energy source 702 provides electricity to a rotary apparatus 100. In some embodiments, the energy source 702 is a renewable energy source. In some embodiments, the energy source 702 is composed of electrical energy from multiple sources, such as renewable energy and electricity from a municipal grid. As described above, the amount of renewable energy relied upon in generating thermal energy may fluctuate depending on the rate and efficiency of renewable energy production. Thus, energy source 702 may include a variety of electrical energy sources, in a variety of ratios, and may vary based on secondary factors such as time of day, circumstantial energy demands of a municipal grid, the weather (in situations where solar and/or wind energy is available).

In the embodiment depicted in FIG. 7, the rotary apparatus 100, powered by the energy source 702, accepts a recycled gaseous heating medium 704 and a recycled gaseous heating medium 704. In some embodiments, the gaseous heating medium is air. In other embodiments, the gaseous heating medium is exhaust gases or recycle gases from a thermal energy generating process. Through the heating operation performed in the rotary apparatus 100, described above, a heated gaseous medium 706 is produced. In some embodiments, the heated gaseous medium 706 has a temperature of about 1000° C., although the temperature of the heated gaseous medium may vary depending on the available energy source, the temperature of the recycled gaseous medium, the needs of the particular application, or the like.

Heated gaseous medium 706 passes to immobile storage medium 708. Immobile storage medium 708 is characterized by an inability to flow, in contrast with the fluidic storage medium illustrated in FIGS. 5 and 6. Immobile storage medium 708 is heated by the heated gaseous medium 706. In some embodiments, immobile storage medium 708 includes a heat transfer tube network distributed throughout the volume of the immobile storage medium, enabling efficient thermal energy transfer from the heated gaseous medium. In other embodiments, the immobile storage medium is porous so that the heated gaseous medium may flow directly over the immobile storage medium itself.

Upon thermal energy transfer from the heated gaseous medium 706 to the immobile storage medium 708, the immobile storage medium 708 may have, for example, a temperature change from about 500° C. to about 800° C. After thermal energy transfer, the recycled gaseous medium 704 exits the immobile storage medium 708 having a reduced temperature, such as about 900° C., and is recycled to the rotary apparatus 100.

Figure 8:
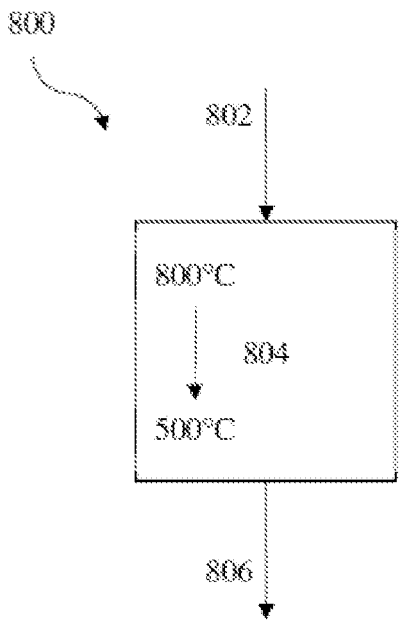

FIG. 8 illustrates an exemplary thermal energy release cycle 800 for a high temperature thermal energy storage system with an immobile storage medium. In some embodiments, such as the embodiment illustrated in FIG. 8, the release cycle 800 may include release of thermal energy after the thermal energy production and storage process 700 illustrated in FIG. 7. A feed water 802 is passed through immobile storage medium 804. Feed water 802 may be any suitable water source. In an exemplary embodiment, feed water 802 is a boiler feed water having a pressure between about 60 bar to about 100 bar and a temperature of around 270° C. Immobile storage medium 804 operates in a similar manner to immobile storage medium 708 in FIG. 7. As feed water 802 passes across or through immobile storage medium 708, thermal energy stored in the immobile storage medium is transferred to the feed water and vaporizing it. Superheated steam 806 exits the immobile storage medium. In an exemplary embodiment, superheated steam 806 has a pressure of between about 60 bar and about 100 bar and a temperature of about 450° C. In some embodiments, as a result of the thermal energy transfer, the immobile storage medium experiences a temperature change from about 800° C. to about 500° C.

In FIGS. 7 and 8, the immobile storage medium may be in the form of, for example, a sand bed, a rock bed, concrete, or any other appropriate storage material. In presented examples, heat storage section 708 (FIG. 7) and 804 (FIG. 8) represents a heat storage unit 101 (FIG. 1).

It is clear to a person skilled in the art that with the advancement of technology the basic ideas of the present invention may be implemented and combined in various ways. The invention and its embodiments are thus not limited to the examples described herein above, instead they may generally vary within the scope of the appended claims.

The invention claimed is:

1. A method for producing and storing thermal energy, the method comprising generation of a heated fluidic medium by at least one rotary apparatus integrated into a thermal energy production and storage facility, the at least one rotary apparatus comprising:

a casing with at least one inlet and at least one exit, a rotor comprising at least one row of rotor blades arranged over a circumference of a rotor hub mounted onto a rotor shaft, and a plurality of stationary vanes arranged into an assembly at least upstream of the at least one row of rotor blades, the method further comprising:

conducting an amount of input energy into the at least one rotary apparatus integrated into the thermal energy production and storage facility, the input energy comprising electrical energy, operating said at least one rotary apparatus integrated into said thermal energy production and storage facility to carry out thermal energy production such that an amount of thermal energy is imparted to a stream of fluidic medium directed along a flow path formed inside the casing between the inlet and the exit by virtue of a series of energy transformations occurring when said stream of fluidic medium passes through the stationary vanes and the at least one row of rotor blades, respectively, whereby a stream of fluidic medium heated to a temperature essentially equal to or exceeding about 500 degrees Celsius (° C.) is generated, and supplying the stream of heated fluidic medium generated by the at least one rotary apparatus into at least one thermal energy storage unit provided within the thermal energy production and storage facility.

2. The method of claim 1, wherein the at least one thermal energy storage unit comprises a thermal energy storage medium configured to store thermal energy in the thermal energy production and storage facility, and wherein the amount of thermal energy is transferred from the heated fluidic medium generated by the at least one rotary apparatus to said thermal energy storage medium.

3. The method of claim 2, wherein the thermal energy storage medium provided within the at least one thermal energy storage unit is any one of sensible heat storage (SHS) medium, latent heat storage (LHS) medium or thermochemical storage (TCS) medium.

4. The method of claim 2, wherein the thermal energy storage medium comprises a stable phase material or a phase change material (PCM).

5. The method of claim 2, wherein the thermal energy storage medium is provided in any one of: a solid phase, a liquid phase, a gaseous phase, or a combination thereof.

6. The method of claim 5, wherein the thermal energy storage medium comprises dissociating solids, liquids, or gaseous compounds.

7. The method of claim 2, wherein the thermal energy storage medium is mobile, and it comprises a fluid.

8. The method of claim 7, wherein the thermal energy storage medium comprises molten salt or a fluidized sand bed.

9. The method of claim 2, wherein the thermal energy storage medium is immobile, and it comprises any one of: metals, stone, concrete, sand, ceramics, or a combination thereof.

10. The method of claim 9, wherein the thermal energy storage medium comprises a fixed sand bed or a rock bed.

11. The method of claim 2, wherein thermal energy is transferred from the heated fluidic medium generated by the at least one rotary apparatus to a heat transfer fluid provided in the at least one thermal energy storage unit.

12. The method of claim 11, wherein the heat transfer fluid comprises synthetic oil or molten salt.

13. The method of claim 2, wherein thermal energy is transferred from the heated fluidic medium generated by the at least one rotary apparatus to the at least one thermal energy storage unit via a heat exchanger.

14. The method of claim 13, wherein the thermal energy is transferred from the heated fluidic medium generated by the at least one rotary apparatus to the thermal energy storage medium and/or to the heat transfer fluid provided in the at least one thermal energy storage unit.

15. The method of claim 13, wherein the thermal energy is transferred from the heated fluidic medium generated by the at least one rotary apparatus to the thermal energy storage medium via a heat transfer tube network immersed in the thermal energy storage medium, wherein the thermal energy storage medium is immobile.

16. The method of claim 1, wherein the fluidic medium that enters the rotary apparatus is an essentially gaseous medium.

17. The method of claim 1, wherein the heated fluidic medium generated in the rotary apparatus comprises any one of: air, nitrogen ($N_2$), steam ($H_2O$), or a combination thereof.

18. The method of claim 1, wherein the heated fluidic medium generated in the rotary apparatus is a recycle gas recycled from off-gases generated during thermal energy production and storage in the thermal energy production and storage facility.

19. The method of claim 1, comprising generation of the fluidic medium heated to the temperature essentially equal to or exceeding about 500 degrees Celsius (° C.), preferably, to the temperature essentially equal to or exceeding about 1200° C., still preferably, to the temperature essentially equal to or exceeding about 1700° C.

20. The method of claim 1, comprising adjusting velocity and/or pressure of the stream of fluidic medium propagating through the rotary apparatus to produce conditions, at which the stream of the heated fluidic medium is generated.

21. The method of claim 1, in which the heated fluidic medium is generated by at least one rotary apparatus comprising two or more rows of rotor blades sequentially arranged along the rotor shaft.

22. The method of claim 1, in which the heated fluidic medium is generated by at least one rotary apparatus further comprising a diffuser area arranged downstream of the at least one row of rotor blades, the method comprises operating the at least one rotary apparatus integrated into the thermal energy production and storage facility such, that an amount of thermal energy is imparted to a stream of fluidic medium directed along a flow path formed inside the casing between the inlet and the exit by virtue of a series of energy transformations occurring when said stream of fluidic medium successively passes through the stationary vanes, the rotor blades and the diffuser area, respectively, whereby a stream of heated fluidic medium is generated.

23. The method of claim 22, wherein, in said rotary apparatus, the diffuser area is configured with or without stationary diffuser vanes.

24. The method of claim 1, in which the amount of thermal energy added to the stream of fluidic medium propagating through the rotary apparatus is controlled by adjusting the amount of input energy conducted into the at least one rotary apparatus integrated into the thermal energy production and storage facility.

25. The method of claim 1, further comprising introducing a reactive compound or a mixture of reactive compounds to the stream of fluidic medium propagating through a heating apparatus, whereupon the amount of thermal energy is added to said stream of fluidic medium through exothermic reaction(s).

26. The method of claim 25, wherein the reactive compound or a mixture of reactive compounds is introduced to the stream of fluidic medium preheated to a predetermined temperature.

27. The method of claim 26, wherein the reactive compound or a mixture of reactive compounds is introduced to the stream of fluidic medium preheated to a temperature essentially equal to or exceeding about 1700° C.

28. The method of claim 1, comprising generation of the heated fluidic medium by at least two rotary apparatuses integrated into the thermal energy production and storage facility, wherein the at least two rotary apparatuses are connected in parallel or in series.

29. The method of claim 28, comprising generation of the heated fluidic medium by at least two sequentially connected rotary apparatuses, wherein the stream of fluidic medium is preheated to a predetermined temperature in at least a first rotary apparatus in a sequence, and wherein said stream of fluidic medium is further heated in at least a second rotary apparatus in the sequence by inputting an additional amount of thermal energy into the stream of preheated fluidic medium propagating through said second rotary apparatus.

30. The method of claim 29, wherein, in at least the first rotary apparatus in the sequence, the stream of fluidic medium is preheated to a temperature essentially equal to or exceeding about 1700° C.

31. The method of claim 29, wherein the additional amount of thermal energy is added to the stream of fluidic medium propagating through said at least second rotary apparatus in the sequence by virtue of introducing the reactive compound or a mixture of compounds into said stream.

32. The method of claim 1, further comprising increasing pressure in the stream of fluidic medium propagating through the rotary apparatus.

33. The method of claim 1, in which the amount of electrical energy conducted as the input energy into the at least one rotary apparatus integrated in the thermal energy production and storage facility is within a range of about 5 percent to 100 percent.

34. The method of claim 1, wherein the amount of electrical energy conducted as the input energy into the at least one rotary apparatus integrated in the thermal energy production and storage facility is obtainable from a source of renewable energy or a combination of different sources of energy, optionally, renewable energy.

35. The method of claim 1, wherein the at least one rotary apparatus is utilized to balance variations, such as oversupply and shortage, in the amount of electrical energy, optionally renewable electrical energy, by virtue of being integrated, into the thermal energy production and storage facility, together with an at least one non-electrical energy operable heater device.

36. The method of claim 1, wherein energy efficiency of the thermal energy production and storage facility is improved and/or wherein greenhouse gas and particle emissions in the thermal energy production and storage facility are reduced.

* * * * *